(12) United States Patent
Wang et al.

(10) Patent No.: US 6,742,076 B2
(45) Date of Patent: May 25, 2004

(54) USB HOST CONTROLLER FOR SYSTEMS EMPLOYING BATCHED DATA TRANSFER

(75) Inventors: Jing Wang, Riverside, CA (US); Ping Liang, Irvine, CA (US)

(73) Assignee: TransDimension, Inc., Irvine, CA (US)

( * ) Notice: Subject to any disclaimer, the term of this patent is extended or adjusted under 35 U.S.C. 154(b) by 397 days.

(21) Appl. No.: 09/754,828

(22) Filed: Jan. 2, 2001

(65) Prior Publication Data

US 2002/0116565 A1 Aug. 22, 2002

Related U.S. Application Data

(60) Provisional application No. 60/174,395, filed on Jan. 3, 2000.

(51) Int. Cl.[7] .............................................. G06F 1/00
(52) U.S. Cl. ....................................... 710/314; 710/306
(58) Field of Search ................................ 710/305–315, 710/8–10, 15–17, 260–262, 267, 266, 268

(56) References Cited

U.S. PATENT DOCUMENTS

| | | | | |
|---|---|---|---|---|
| 5,933,611 | A | * | 8/1999 | Shakkarwar ................. 710/308 |
| 5,974,486 | A | * | 10/1999 | Siddappa ...................... 710/53 |
| 6,067,589 | A | * | 5/2000 | Mamata ........................ 710/63 |
| 6,256,687 | B1 | * | 7/2001 | Ellis et al. .................... 710/71 |
| 6,272,563 | B1 | * | 8/2001 | Ajanovic et al. ............. 710/29 |
| 6,389,495 | B1 | * | 5/2002 | Larky et al. ................. 710/306 |
| 6,505,267 | B2 | * | 1/2003 | Luke et al. .................. 710/315 |
| 6,567,875 | B1 | * | 5/2003 | Williams et al. ............ 710/302 |

OTHER PUBLICATIONS

"Technology Brief: USB and the Differences Between OHCI and UHCI", Compac Computer Corporation, Sep. 1997, pp. 1–8.
Richard A. Quinnell, Technical Editor, "USB: a neat package with a few loose ends", http://www.ednmag.com/reg/1996/102496/df_01.htm, pp. 1–11.
"USB Two–Point–Oh–My! Intel Reverses Course, Puts Squeeze On FireWire", GCSF, Incorporated, Mar. 4, 1999, http://www.mackido.com/Hardware/USB20.html, pp. 1–12.
"Enumeration and Device Descriptors", http://usb.in.tum.de/usbdoc/node9.html, 1 page.
"Standard Descriptors", http://usb.in.tum.de/usbdoc/node10.html, 1 page.
"Device Classes", http://usb.in/tum.de/usbdoc/node11.html, 1 page.
"Human Interface Devices (HID)", http://usb.in.tum.de/usbdoc/node12.html, 1 page.
"Data Flow Types", http://usb.in.tum.de/usbdoc/node8.html, 1 page.
"USB Devices and Transfer Characteristics", http://usb.in.tum.de/usbdoc/node6.html, 1 page.
"The Universal Serial Bus", http://usb.in.tum.de/usbdoc/node4.html, 1 page.
"Host Controllers", http://usb.in.tum.de/usbdoc/node5.html, 1 page.
Brain, Marshall, "How USB (Universal Serial Bus) Ports Work", http://www.howstuffworks.com/usb2.htm, pp. 1–3.
Brain, Marshall, "How USB (Universal Serial Bus) Ports Work", http://www.howstuffworks.com/usb1.htm, pp. 1–2.
Brain, Marshall, "How USB (Universal Serial Bus) Ports Work", http://www.howstuffworks.com/usb.htm, pp. 1–4.
"USB Overview", Quatech, http://www.quatech.com/Application_Objects/FAQs/comm–over–usb.htm, pp. 1–4.
"Hubs", http://usb.in.tum.de/usbdoc/node7.html, 1 page.

* cited by examiner

*Primary Examiner*—Paul R. Myers
*Assistant Examiner*—Raymond N Phan
(74) *Attorney, Agent, or Firm*—Knobbe, Martens, Olson & Bear, LLP

(57) ABSTRACT

A USB host controller for embedded systems employing batched data transfer. The system batches up to 16 individual transactions in a single batch to reduce the number and frequency of interrupts to the microprocessor and to increase USB data throughput.

28 Claims, 12 Drawing Sheets

| Address | Content |
|---|---|
| 000h – 00Fh | Host Controller Control Registers |
| 010h – 3FFh | Reserved |
| 400h – 4FFh | Control Memory (CM). Partitioned into 16 Transaction Descriptors (XDs) each consisting of 16 bytes. |
| 500h – 7FFh | Reserved |
| 800h – FFFh | 2K bytes of Data Memory (DM) |

FIG. 6

USB HOST CONTROLLER FOR SYSTEMS EMPLOYING BATCHED DATA TRANSFER

RELATED APPLICATIONS

This application claims the benefit of U.S. Provisional Application No. 60/174,395 entitled USB HOST CONTROLLER AND HOST DRIVER INTERFACE filed Jan. 3, 2000.

BACKGROUND OF THE INVENTION

1. Field of the Invention

The present invention relates to the field of electronic devices and the transfer of data there between and, in particular, to providing a host controller and host controller driver interface to microprocessor based embedded systems for interconnecting devices via a serial bus. More specifically, the present invention relates to a Universal Serial Bus (USB) host controller and host controller driver interface for embedded systems that employ batched data transfer.

2. Description of the Related Art

Electronic devices are often electrically connected to one or more other electronic devices. For example, microprocessor based systems, such as personal computers, are often connected to one or more peripheral devices such as printers, scanners, graphics tablets, digital cameras and the like. The connection to peripheral devices can take place via a number of known serial or parallel interfaces.

The Universal Serial Bus (USB) is one standardized serial interface that has been developed to offer flexible, high, moderate and low-speed interconnections between a host device and external, peripheral devices. USB was developed to accomplish three main goals: connection of a microprocessor based system to a telephone system, plug-and-play of peripheral devices in a hot swappable manner, and ready expansion of a microprocessor based system's peripheral connectivity.

USB employs a four-wire connector. Two wires supply power (up to 500 mA at 5 vdc) and the other two wires form a twisted-pair, differential data line. USB employs a master-slave architecture with a tiered-star topology. One or more hubs can be connected to a host or root tier to expand the capacity of a USB system. Hubs can also be connected to other hubs to further expand the system. A single USB host can support up to 127 separate devices.

USB currently supports data transfer at a high speed of 480 Mbps, a full speed of 12 Mbps, and a low speed of 1.5 Mbps data rate. There are four types of USB transfers: isochronous, bulk, interrupt and control. Isochronous transfer is not error checked as the need for uninterrupted data transfer at a given data rate overrides the need for error-free transmission. The other three types of transfer contains error-checking mechanisms, data sequence toggle sequences and retry sequences to guarantee error-free data transfer.

A USB system has a single USB host. FIG. 1 shows four layers of a typical USB system. These areas are the Client Software/USB Driver, Host Controller Driver (HCD), Host Controller (HC), and USB Device. The Client Software/USB Device and Host Controller Driver are implemented in software. The Host Controller and USB Device are implemented in hardware. The Host Controller Driver and Host Controller work in tandem to transfer data between client software and a USB device. In the prior art, as described in the two industry standard host specification, the "Universal Host Controller Interface (UHCI) Design Guide" Revision 1.1 published by the Intel Corporation, and the "OpenHCI: Open Host Controller Interface Specification for USB," (OHCI) Revision 1.0a, published by Compaq, Microsoft and National Semiconductor, to achieve high transfer rates on USB, the Host Controller requires a bus interface with bus master capability, such as a Peripheral Component Interface (PCI) bus, to interface with the CPU. Bus mastering requires that more than one device be able to control the data over a bus. Generally, a microprocessor must relinquish control of the bus to another device to allow this to occur.

However, there is a need for a USB Host Controller for embedded systems and microprocessors which do not have a bus interface with bus mastering capability such as a PCI bus. Such a USB Host Controller is referred to as an embedded USB Host Controller which can be interfaced via a standard processor bus interface to any microprocessor, microcontroller, digital signal processor, FPGA processor or any other processor (hereafter referred to as microprocessor). In the prior art, these embedded Host Controllers suffer the shortcoming of low data transfer rate and frequent interrupts to the microprocessor because the microprocessor is interrupted every transaction. Without the bus mastering capability, prior art embedded USB host controllers interrupt the microprocessor for each transaction to report the status of the transaction to the microprocessor, and for the microprocessor to process the just finished transaction, read data from and/or write data into the USB host controller, and prepare and dispatch the next transaction.

Moreover, each interrupt of the microprocessor involves an interrupt latency period. The latency period is the time during which the microprocessor stores the data and status conditions related to task at hand, before it can attends to the request of the USB host. An example timing diagram for the interaction of the microprocessor and a prior art embedded USB host controller showing the interrupt latency period is illustrated in FIG. 2

The interrupt latency period and the interrupt recovery period waste the microprocessor's time. The USB bus is idle during both the interrupt latency period and the period for the microprocessor to process the current transaction and prepare for the next transaction. That is, there is no data on the USB bus, which results in very low data throughput. The process also slows the microprocessor system as the microprocessor must cease operating on whatever task before the interrupt, attends to the USB host controller, and then recover its working environment to pick up again where it was before.

More specifically, the microprocessor must typically take time to store the registers and context it was working on when it received the interrupt and subsequently retrieve the registers and context and resume processing it upon completion of the task requested by the USB interrupt. The time to cease operation, store the registers and context, and then later retrieve the registers and context and resume processing contributes greatly to the increased inefficiency of the microprocessor during USB interrupts. This can significantly reduce the throughput of the USB connection, as well as the performance of the microprocessor system, below optimum.

OHCI and UHCI host controllers overcomes this problem using reverse bus mastering, such as that provided by a known PCI bus, and equip the host controller with the capability to process sequentially one-by-one a list of transactions scheduled in the microprocessor's system memory. In this method, upon each transaction, the USB host controller uses the reverse bus master mechanism to access the system memory, processes the transaction, exchanges data with the system memory, and start the next transaction, all without interrupting the microprocessor. While this method does significantly improve the throughput of the USB, it is not applicable to many embedded systems where there is no reverse bus mastering mechanism either due to cost reasons, architectural or software considerations.

From the foregoing, it will be appreciated that there is a need for a system that permits more efficient USB transfers in an embedded system. To this end, there is a need for an improved system that reduces the interrupts to microprocessor and improves the data throughput on USB for a host system having an embedded USB architecture.

SUMMARY OF THE INVENTION

The aforementioned needs are satisfied by the present invention which in one aspect comprises a USB host controller system for interfacing between at least one USB device and a host processor. The system comprises a host controller that transfers USB transactions between at least one USB device and a host processor. The system further includes at least one memory associated with the host controller, wherein the host controller stores the information indicative of a plurality of USB transactions in the memory and executes a plurality of stored USB transactions in a single batch so as to reduce the overall resource demands on the host processor to execute the USB transactions and to increase data throughput on the USB.

In another aspect, the invention comprises a method of interfacing a plurality of USB device with a host processor. The method comprises assembling a first batch of USB transactions in a memory, sequentially executing each of the USB transactions of the first batch in the memory and sending an interrupt signal to a host processor indicating that the first batch of transactions has been completed so that the host processor is interrupted less thereby reducing the overall resource demand on the host processor during execution of the first batch.

In yet another aspect, the invention comprises a USB host controller that is adapted to receive and assemble information indicative of a plurality of USB transactions from a host processor wherein the USB host controller executes an assembled batch of a plurality of USB transactions upon meeting a certain condition and wherein the host processor is informed of the availability of the status of the plurality of transactions upon completion of the batch to thereby reduce the overall resource demand on the host processor during execution of the batch of USB transactions.

In yet another aspect, the invention comprises a USB system that comprises a host microprocessor, at least one memory associated with the host microprocessor and an embedded microprocessor bus whose bus master for memory access is the host microprocessor. In this aspect, the USB system further comprises an embedded USB host controller that sends interrupt signals to the host microprocessor such that the host microprocessor in response to the interrupts manipulates data in the at least one memory such that the USB host stack associated with the USB system that is designed to be used with a bus that is controllable by the USB host controller can be mused with the embedded USB host controller.

BRIEF DESCRIPTION OF THE DRAWINGS

FIG. 6 shows a memory map of one embodiment of the host controller system of FIG. 5;

DETAILED DESCRIPTION OF THE PREFERRED EMBODIMENT

Figure 1:
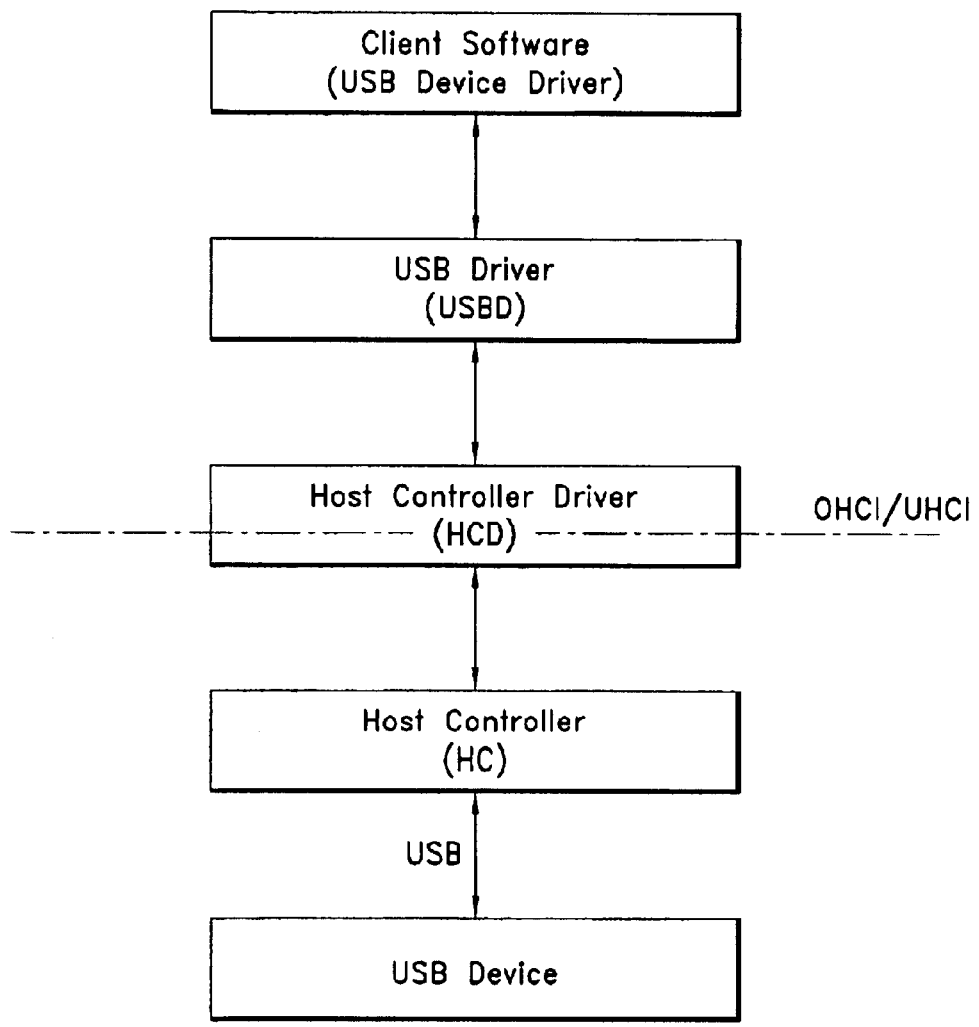
FIG. 1 is an overview of a USB system.

Reference will now be made to the drawings wherein like numerals refer to like parts throughout. As discussed above, FIG. 1 is a block diagram of a typical USB system. The typical USB system includes a software component comprising the client software, the USB driver and the host controller driver. These drivers are generally resident on the host microprocessor and allow for the data transfer between the host system and the peripheral devices. As is illustrated in FIG. 1, the typical USB system also includes a hardware implemented host controller that communicates with the host microprocessor using the software drivers. The typical USB system permits two way transfer of data between the memories associated with the host system and the peripheral devices. In other words, data can either be transferred from the peripheral device to the host device, e.g., such as when a scanned image is being transmitted from a scanner to a host computer for storage in memory, or data can be transferred from the host device to the peripheral device e.g., such as when a document stored in the memory of the host system is being sent to a peripheral printer for printing.

As will be described in greater detail below, the host controller system of the preferred embodiment, is designed so as to transfer transactions between a host system and peripheral devices in a batched format. In this way, the throughput of the system can be improved and the demands on the host microprocessor can be reduced. A batch is defined as a plurality of USB transactions executed one after another which is started after the host microprocessor sends a command or a signal to the host controller, or which is started by the microprocessor writing into the host controller information indicative of a certain number of USB transactions, or which is started by one or more internal signals in the host controller, or which is started by the microprocessor writing into the host controller certain information to a certain address. Alternatively, a batch is a plurality of USB transactions carried out one after another without requiring further intervention from the host processor, or executed after a certain condition is met. In any case, the status of the batch can be reported by the host controller with a single interrupt to the microprocessor or can be accessed by the host microprocessor at its own initiative as a group after the plurality of USB transactions are executed.

Figure 1A:
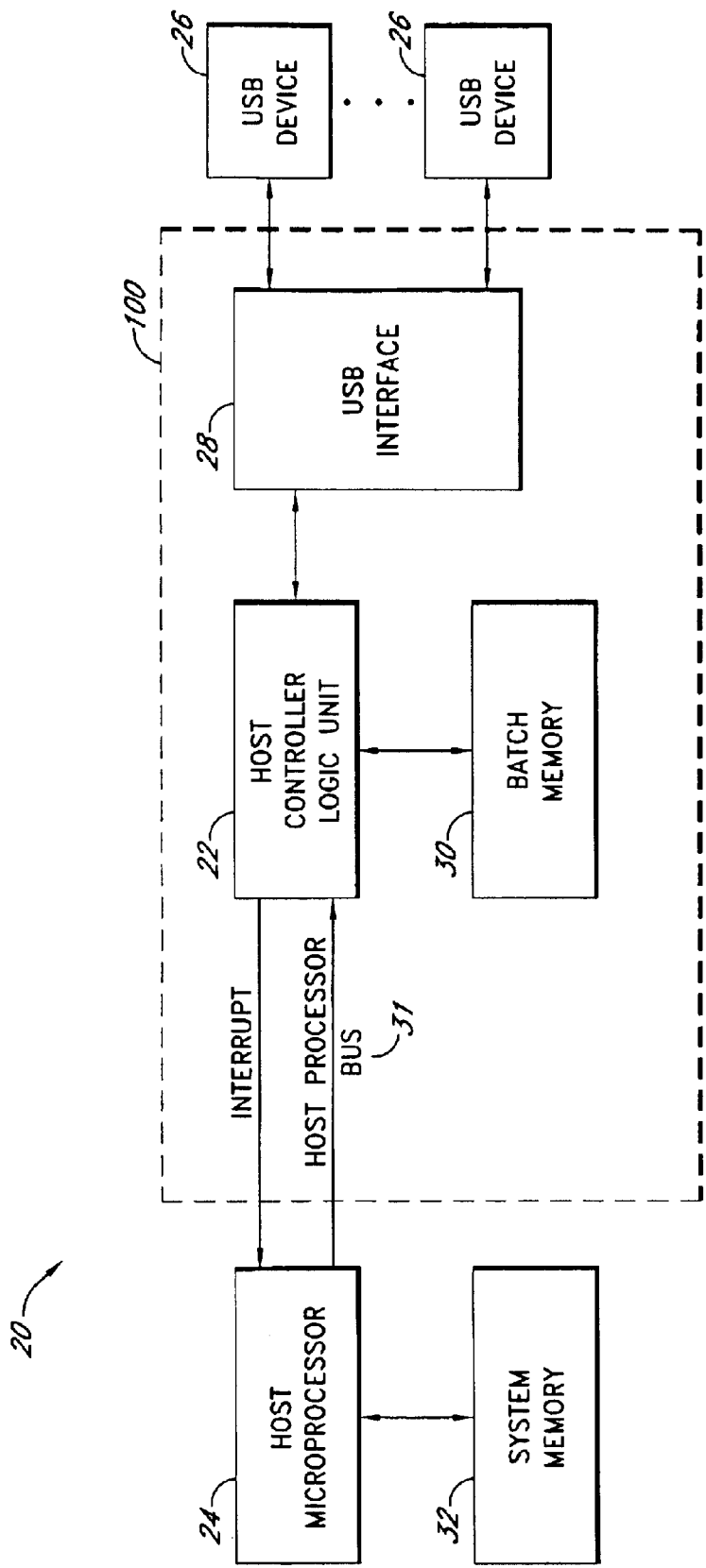
FIG. 1A is a high level block diagram of a USB system suitable for batch transfer of USB transactions of the preferred embodiment.

Referring now to FIG. 1A, a block diagram of a USB system 20 of the illustrated embodiment that is capable of batching transactions between USB devices and a host microprocessor in a memory is illustrated. The USB system is able to send a batch of transactions between the host system and the peripheral devices to thereby reduce interrupt frequency and improve data throughput. As is illustrated in FIG. 1A, the USB system includes a host controller system 100 that will be described in more specific detail in connection with FIG. 5. The host controller system 100 generally includes a host controller logic unit 22 that is capable of sending an interrupt signal to a host microprocessor 24. As will be described in greater detail below, the interrupt signal results in the host microprocessor 24 ceasing its present operation and storing the data associated therewith to attend to the batched USB transactions using the host controller system 100.

The host controller logic unit 22 receives data transfer requests in the format of USB transactions from the host microprocessor 24. These data transfer requests can either comprise data that is to be transferred from USB device(s) 26 to the host system for storage in the system memory 32 or requests for data from the system memory 32 of the host system to the USB device(s) 26. The host controller logic unit 22 is connected to the host microprocessor 24 via the host processor bus 31 that allows for the transfer of data between the host microprocessor 24 and the host controller system 100. In this embodiment, the host processor bus 31 is an embedded data bus that is slaved to the host microprocessor 24 and is not configurable so as to be controlled by the host controller system 100.

Figure 2:
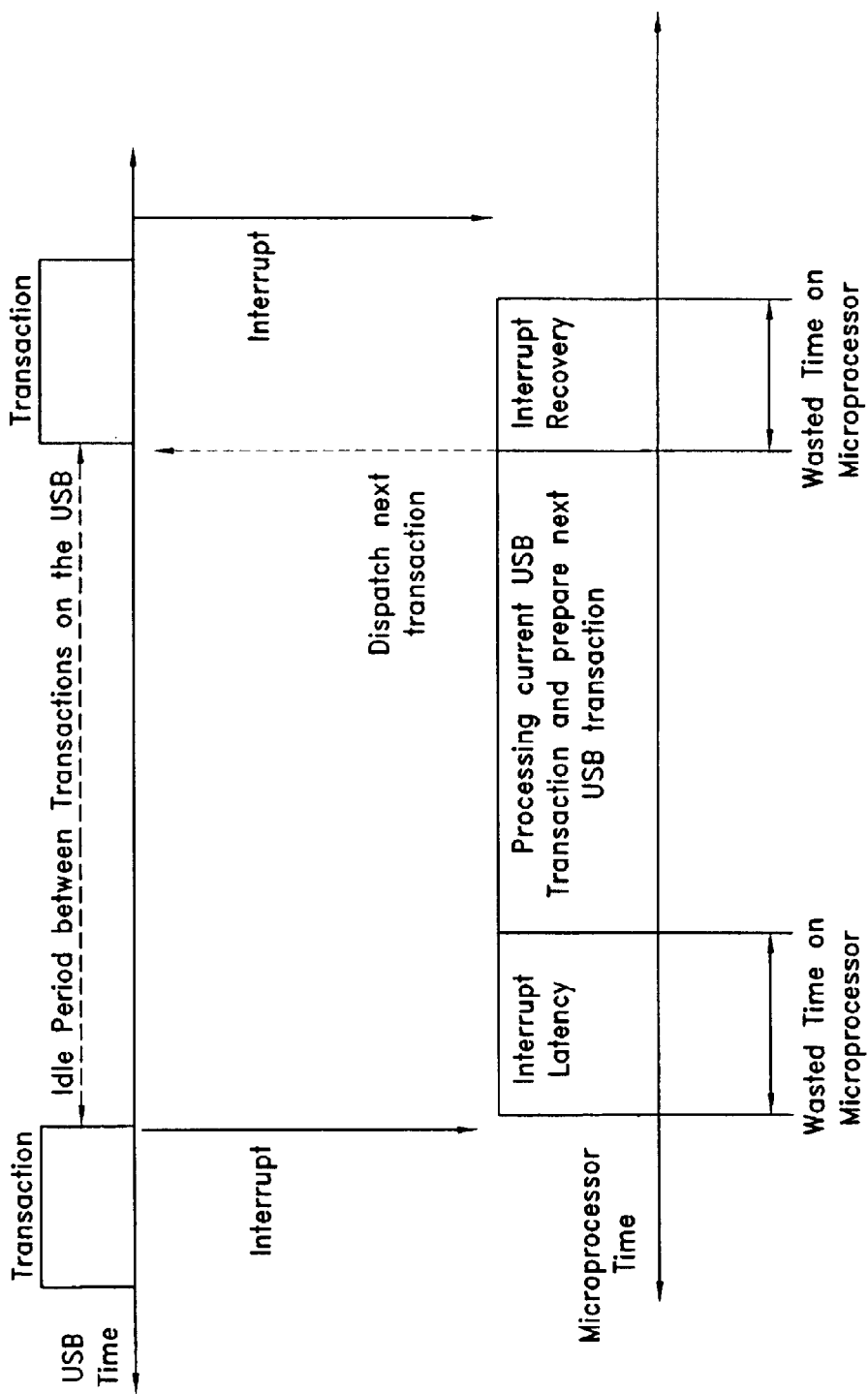
FIG. 2 is a timing diagram illustrating idle period and frequent interrupts as it occurs in prior art embedded systems.

In the prior art, once a USB transaction between the host system and a USB device is executed, the host controller logic unit 22 sends an interrupt signal to the host microprocessor 24 to induce the host microprocessor 24 to review the transaction and prepare the next transaction in the manner that will be described in greater detail herein below. However, as discussed above, sending the interrupt results in wasted time on the host microprocessor in the form of interrupt latency and interrupt recovery as is illustrated in FIG. 2. Basically, when the interrupt is send to the host microprocessor 24, the cached data and instructions and registers relating to the task that the host microprocessor 24 is currently executing must then be stored by the host microprocessor 24 in the system memory 32. Once this data is stored, the host microprocessor can then process the USB the host controller request. As is illustrated in FIG. 2, the USB is essentially idle during the period that host microprocessor 24 is storing the data and instructions and registers and is then processing the just executed USB transaction.

The host microprocessor 24 is not engaged in processing either the USB initiated task or the original host task in the interrupt latency period as identified in FIG. 2. Moreover, once the USB task is complete, the host microprocessor 24 must then retrieve the stored instructions and data and registers relating to the interrupted host task which is the period labeled interrupt recovery in FIG. 2. During both the interrupt latency and interrupt recovery periods, the host microprocessor 24 is not engaged in processing either the host task or the USB task which thus represents a loss of valuable processing time for the host microprocessor 24.

As is also illustrated in FIG. 2, the USB bus is also idle while the host microprocessor is processing the current USB transaction and is preparing for the next USB transaction. Hence, for a single USB transaction, there is a considerable period of time where the USB bus is idle which reduces the throughput of the USB bus. Moreover, as is also illustrated in FIG. 2, the host microprocessor 24 is interrupted by each and every USB transaction, which can cause the microprocessor to spend most of its time getting into and out interrupts, making it unable to attend to its main application.

To address these problems, the USB system of the illustrated embodiment includes a batch memory 30 in the host controller system 100 as is illustrated in FIG. 1A. The batch memory 30 is configured so that the microprocessor 24 host controller system 100 can batch together a plurality of USB transactions in the batch memory that can be dispatched by the microprocessor 24 by sending a single command or signal to the host controller logic unit 22. As will be described in greater detail below, the host controller logic unit 22 is configured to execute a batch of USB transactions in the batch memory 30 and then send a single interrupt to the host microprocessor 24 at one time over the bus 31. In this way, the host microprocessor 24 experiences only a single interrupt latency period and a single interrupt recovery period for a plurality of USB transactions. Thus, the efficiency of the host microprocessor 24 is improved as it no longer requires an interrupt latency period and an interrupt recovery period for each and every USB transaction. Since the batched USB transactions are executed one after another without the intervention of the microprocessor 24, there is also no idle time between successive USB transactions on the USB bus except at the end of a batch. Moreover, in one embodiment, the batch memory 30 is capable of permitting subsequent batches of transactions to be assembled while the host microprocessor 24 is currently working on an existing transaction. In this way, the idle period of the USB interface is further reduced thereby increasing the overall throughput of the USB interface.

Figure 3A:
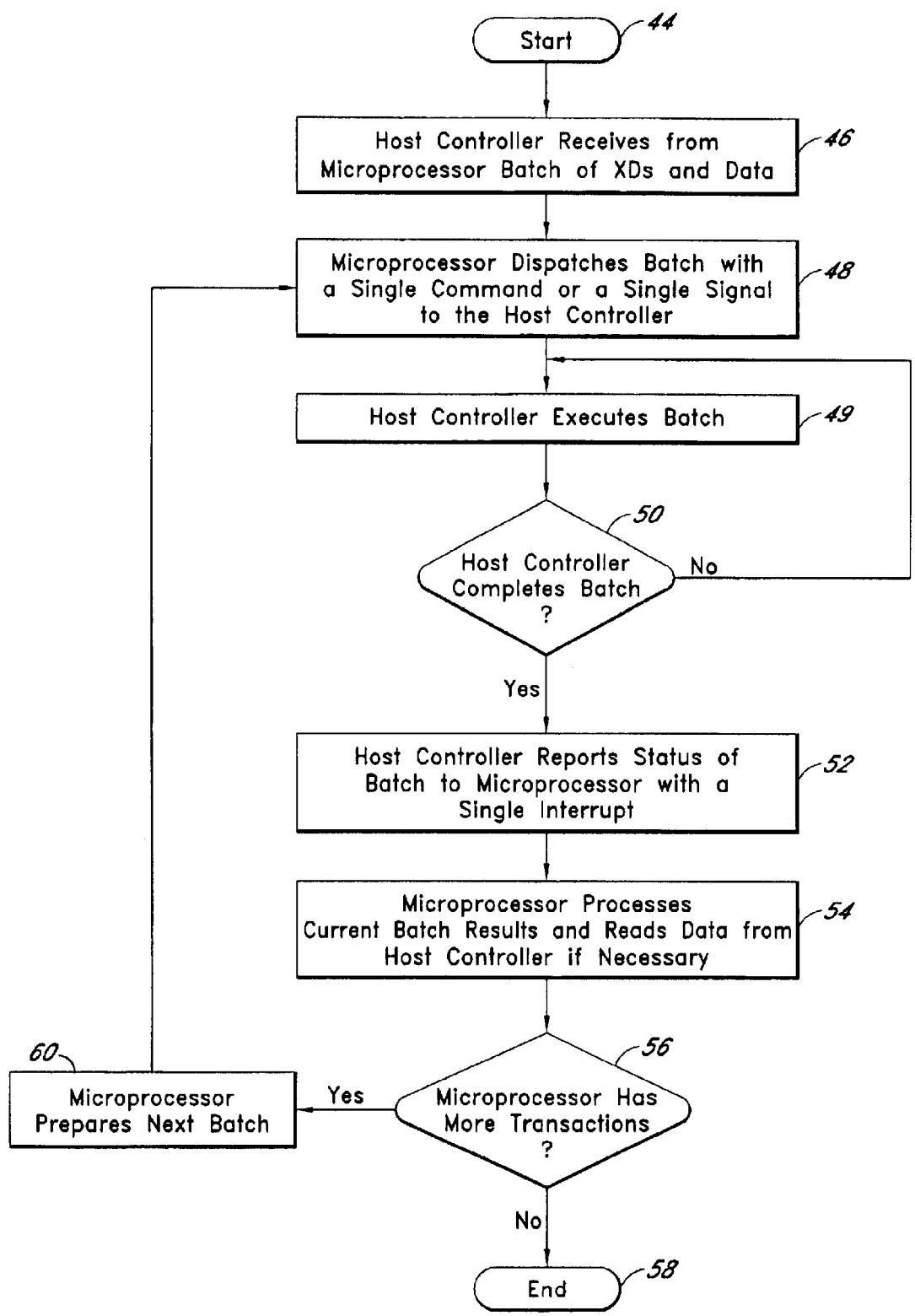
FIG. 3A is a high-level flow chart illustrating a batch process implemented by the system of FIG. 1A.

FIG. 3A is a high level flow chart that illustrates the operation of the system 20 of the preferred embodiment as successive batches of transactions are transferred between the host microprocessor 24 and the USB host controller system 100. Initially, from a start state 44, the host controller system 100 receives from the host microprocessor 24 a batch of transaction descriptors (XDs). Software in the host microprocessor 24 controls the assembly of the batch of transactions and each transaction can comprise either a transfer of data from a peripheral USB device 26 to the system memory 32 or can comprise a transfer of data from the system memory 32 to a designated peripheral USB device 26.

For a transaction transmitting data to a designated USB device 26 (called an OUT transaction or SETUP transaction in USB specification), the microprocessor will write the data in a segment of the batch memory 30 designated for the transaction. For a transaction receiving data from a designated device 26 (called an IN transaction in USB specification), the microprocessor will allocate a segment of the batch memory 30 as the buffer for the transaction. In this embodiment, each batch is comprised of up to 16 transactions. In this embodiment, the host controller system 100 stores each of the transaction descriptors (XDs) in a designated section of the batch memory 30 and the corresponding data or buffer in a corresponding designated section of the batch memory 30 in the manner that will be described in greater detail in reference to FIG. 5 herein below.

Hence, the host controller system 100 and the host microprocessor 24 assemble a plurality of transactions into a batch that is stored in the batch memory 30 for subsequent transfer between the host controller 100 and the USB devices. Once the batch has been fully assembled, the microprocessor 24 induces the dispatch of the assembled batch in state 48 with a single command or signal to the host controller system 100. This results in the host controller system 100 reading each of the transaction descriptors (XDs) and executing the corresponding transaction, transmitting the data from the batch memory to the designated USB device 26, or receiving data from designated USB device and storing the received data in the buffer allocated to the transaction in the batch memory 30. The host controller system 100 thus acts on each of the transactions within the batch in state 49 until it decides in decision state 50 that it has completed the batch.

Once the host controller system 100 has completed the batch it sends a single interrupt signal to the host microprocessor 24 in state 52 indicating that the batch of transactions have been completed. The host microprocessor 24 then reviews the results of the batch of transactions in state 54 to ascertain the status of the current batch of transactions. If there are IN transactions, the microprocessor 24 reads the data from the designated buffers in the batch memory 30 and loads the data into the system memory 32.

In some circumstances, one or more of the transactions would not have been successfully transacted which may result in the microprocessor 24 determining that the transaction must be resent as part of the next batch. The microprocessor 24 then determines in decision state 56 whether it has more transactions that must be transferred between the host system and the USB devices. This determination is made based upon the information determined in state 54 as well as from client software or USB device drivers running on the microprocessor. If no additional transactions are needed to be sent, the microprocessor then proceeds to an end state 58 wherein it can be dedicated to other tasks. Alternatively, if the host microprocessor 24 determines in state 56 that additional transactions are needed, it then prepare the next batch in state 60 and then proceeds to transmit the transaction descriptors XDs and associated data in state 46.

In another embodiment, part of the preparation of the next batch in state 60 can occur concurrently with the execution of the batch of transactions in states 49 and 50. This way, the next batch can be dispatched sooner, preferably right after the microprocessor reviews the status of the current batch.

Figure 3B:
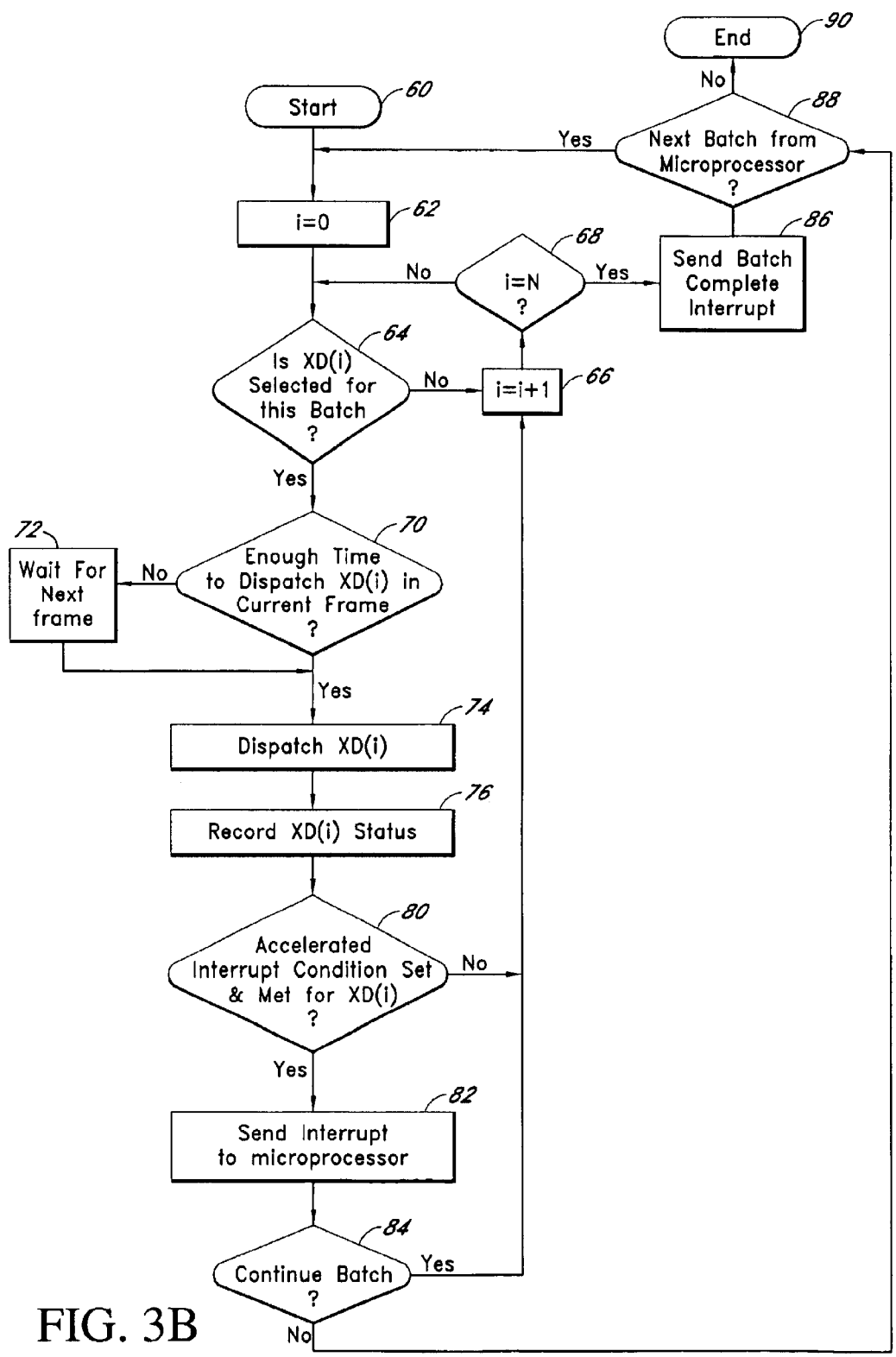
FIG. 3B is a high-level flow chart illustrating a batch transfer function of FIG. 3A.

In this way, the microprocessor 24 can induce the host controller system 100 to process a batch of USB transactions in the batch memory 30 and evaluate the results in a single step before returning to the host task. This results in less demand on the host system resources which improves the performance of the host system. The manner in which the host controller system 100 acts on the batch of USB transactions is described in greater detail in FIG. 3B.

Specifically, once the host controller system 100 has received the batch of transaction descriptors XD and the associated data from the microprocessor 24 for OUT or SETUP transactions, or buffer allocation for IN transactions, the host controller system 100 then sequentially processes the USB transactions. More particularly, from a start state 61, the host controller system 100 initializes in state 62 a variable i, indicative of the particular USB transaction being processed, to zero. The host controller system 100 then determines in decision state 64 whether the particular USB transaction having the transaction descriptor XD(i) has been selected by the microprocessor 24 as to be executed with the particular batch. As will be described in greater detail below, the transaction descriptors are stored in a list in the batch memory and the microprocessor can designate some or all of the transaction descriptors to be executed as part of a batch or processed in a different manner. Particular identifiers that are described in more detail below are then read by the host controller system 100 to determine whether to execute a particular USB transaction.

If the particular USB transaction XD(i) is not to be executed as part of the batch, the host controller system 100 then increments the variable i in state 66 and then determines in decision state 68 whether all of the transaction descriptors in the batch received by the host controller in state 46 (FIG. 3A) have been executed. In this implementation, the host controller system 100 determines whether the variable i has been incremented to be equal to the number of USB transactions N selected for the batch.

If all of the USB transactions in the batch has been completed the host controller system 100 sends a batch complete interrupt in state 86 to the host microprocessor 24. If the USB transactions in the batch have not been completed, the host controller then returns to decision state 64 to determine whether the next sequential transaction descriptor XD(i) is selected for the batch being processed.

If a particular transaction is selected to be executed in the batch, the host controller then determines in decision state 70 if there is enough time to dispatch the USB transaction XD(i) in the current USB frame. As is understood, USB bus time are partitioned into frames that are 1 mSec. in duration and the host controller system 100 must be able to complete a transaction before the end of frame. Otherwise, USB transaction traffic may collide with the Start of Frame (SOF) signal on the USB. If there is not enough time, the host controller system 100 then waits, in state 72, for the next frame. Alternatively, the host controller may mark the current transaction as unexecuted and move on to the next transaction selected for inclusion in the current batch. A transaction marked unexecuted in the current frame can be executed at the beginning of the next frame or can be included in the next batch.

Subsequently, the USB transaction identified by the transaction descriptor XD(i) is then dispatched in state 74 by the host controller system 100. The host controller system 100 monitors whether the USB transaction was completed and updates, in state 76, a record in the transaction descriptor for the USB transaction indicative of the status of the executed transaction. The updated record can then be evaluated by the microprocessor 24 in state 54 (FIG. 3A) in the manner previously described.

The host controller system 100 then determines in decision state 80 whether there is an accelerated interrupt condition for the USB transaction XD(i) that has been met. Such an accelerated interrupt condition is set by the microprocessor for a particular USB transaction for a number of different reasons. One example of a situation that could warrant an immediate interrupt signal being sent to the microprocessor 24 is if a particular USB transaction, that is needed for subsequent transactions, was not successfully completed in state 74. In this circumstance, it may be necessary to halt dispatching of the batch in decision state 84 and proceed to determine whether to process the next batch from the microprocessor 24 in decision state 88.

If there is no accelerated interrupt condition that has been set for XD(i) or one is set but not met, the host controller then increments the variable i in state 66 and proceeds to the next transaction in the batch in state 64. The process comprising the steps 64 through 84 is then continued for each of the transactions XD(i) until the host controller system 100 determines the batch has been completed in state 68. Once the batch has been completed, the host controller system 100 then sends the batch complete interrupt signal to the microprocessor 24 and then determines if another batch has been sent by the microprocessor in decision state 88.

As will be described in greater detail below, the batch memory 30 can be used as a double buffer such that when a batch is being executed by the host controller system 100, the microprocessor 24 can be simultaneously sending additional USB transactions to a different part of the batch memory to assemble another batch for subsequent processing and dispatch by the host controller system 100. In this way, the throughput of the USB system can be enhanced as the idle period of the USB host controller system 100 is decreased.

Figure 4:
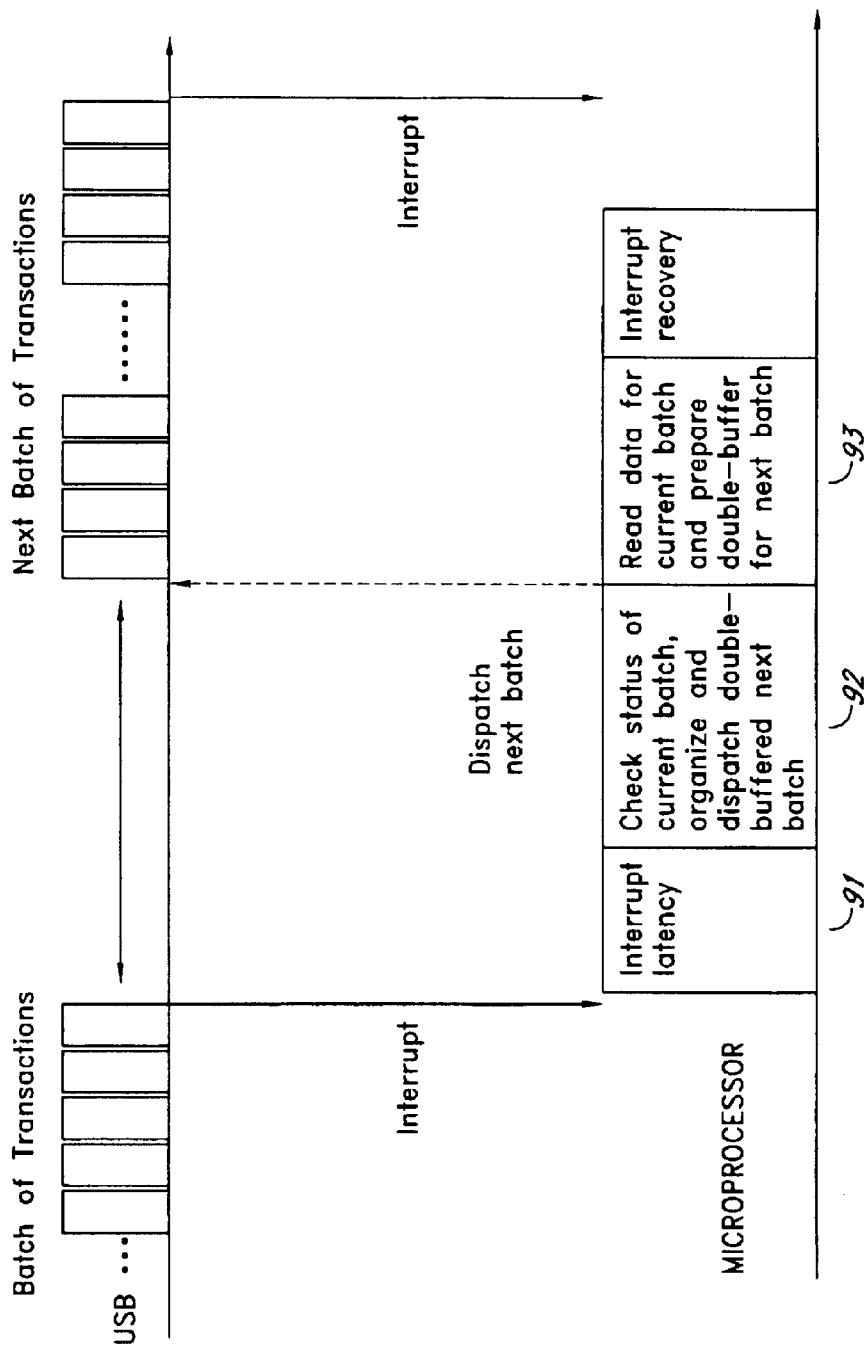
FIG. 4 is a timing diagram illustrating the batching, the enhanced data throughput and the reduced interrupts of the process of FIGS. 3A and 3B.

The improved throughput of the USB host controller system 100 and the decreased idle time on the USB is illustrated in greater detail in the timing chart of FIG. 4. More specifically, FIG. 4 illustrates that the microprocessor sends an initial batch of USB transactions to the host controller system 100 which are then processed and dispatched by the host controller system 1000 in the previously described manner. Only when the entire batch has been completed, is there an interrupt generated in state 52 (FIG. 3A) by the host controller system 1000 that results in the interrupt latency period 91 where the microprocessor 24 is halting the host task to then check and evaluate the status of the current batch and to organize and dispatch the next double buffered batch in the period 92. Following the period 92, the single command is sent to the host controller in state 48 (FIG. 3A) that initiates the process illustrated in FIG. 3B.

The batch memory 30 is preferably organized so as to be able to receive USB transactions from the host microprocessor 24 for one batch while the host controller system 100 is acting on another batch. Similarly, while the host controller system 100 is executing the next batch of transactions, the microprocessor 24 is reading data for the current batch and is preparing the next batch of transactions in period 93. Thus, the idle time that the USB system experiences is limited to the interrupt latency period and the period where the microprocessor 24 is evaluating the previously executed batch. Consequently, the throughput of the system is significantly enhanced.

The foregoing description in connection with FIGS. 1–4 generally illustrate the USB host controller system 100 of the present invention. FIGS. 5–9 provide a more detailed description of a preferred implementation of the system 100 described above.

Figure 5:
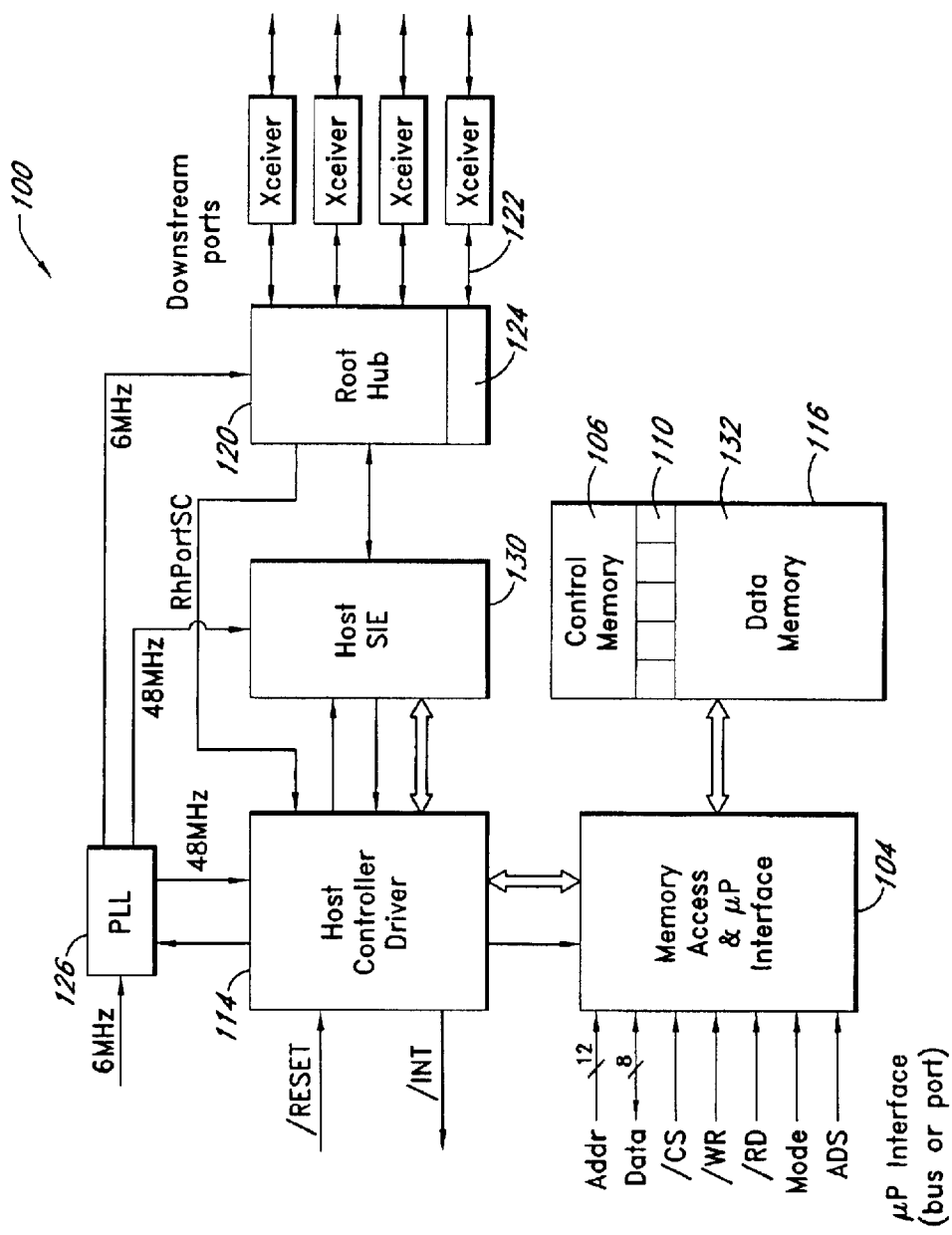
FIG. 5 is a functional block diagram of one embodiment of a host controller system of the USB system of FIG. 1A.

More specifically, FIG. 5 is a functional block diagram of one embodiment of a host controller system 100 of the implemented embodiment. The host controller system 100 is a low-cost, high-performance interface system compliant with USB Specification. The host controller system 100 provides a full function USB host to a microprocessor, microcontroller, digital signal processor (DSP), field programmable gate array (FPGA) processor, or other processor 24 of types well known in the art.

The host controller system 100 of this embodiment involves a microprocessor interface 104. The microprocessor interface 104 provides the functionality of the data bus 31 of FIG. 1A and it enables the host controller system 100 to access and communicate with microprocessors 24 and associated memory devices. In another embodiment, the host controller system 100 is interfaced directly from I/O ports of the processor 24. In this embodiment, the host controller system 100 comprises an automatically incrementing address register allowing the read and write of a block of memory in the host controller system 100 with a single address write. These two interface modes allow the host controller system 100 to be connected to virtually any processor 102.

Figure 9A:
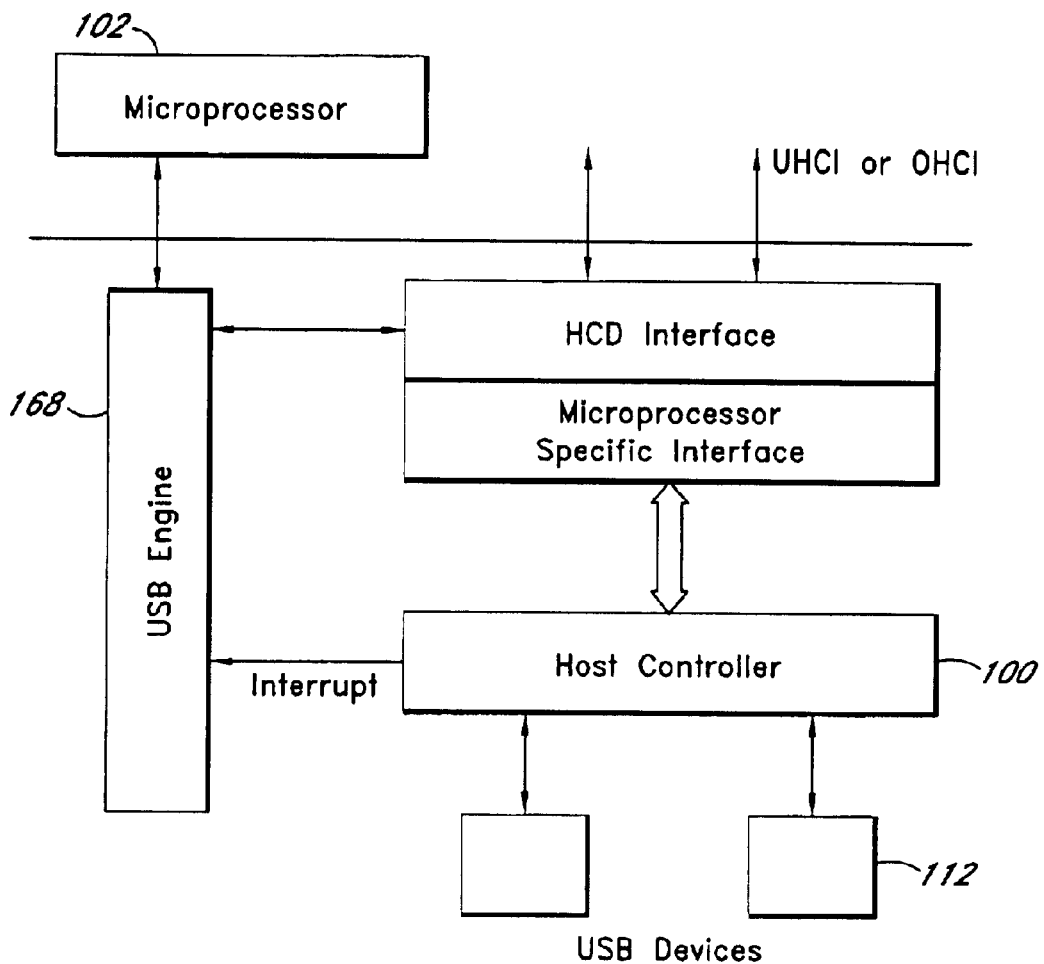
FIG. 9a is a block diagram of an UHCI or OHCI interface.
Figure 9B:
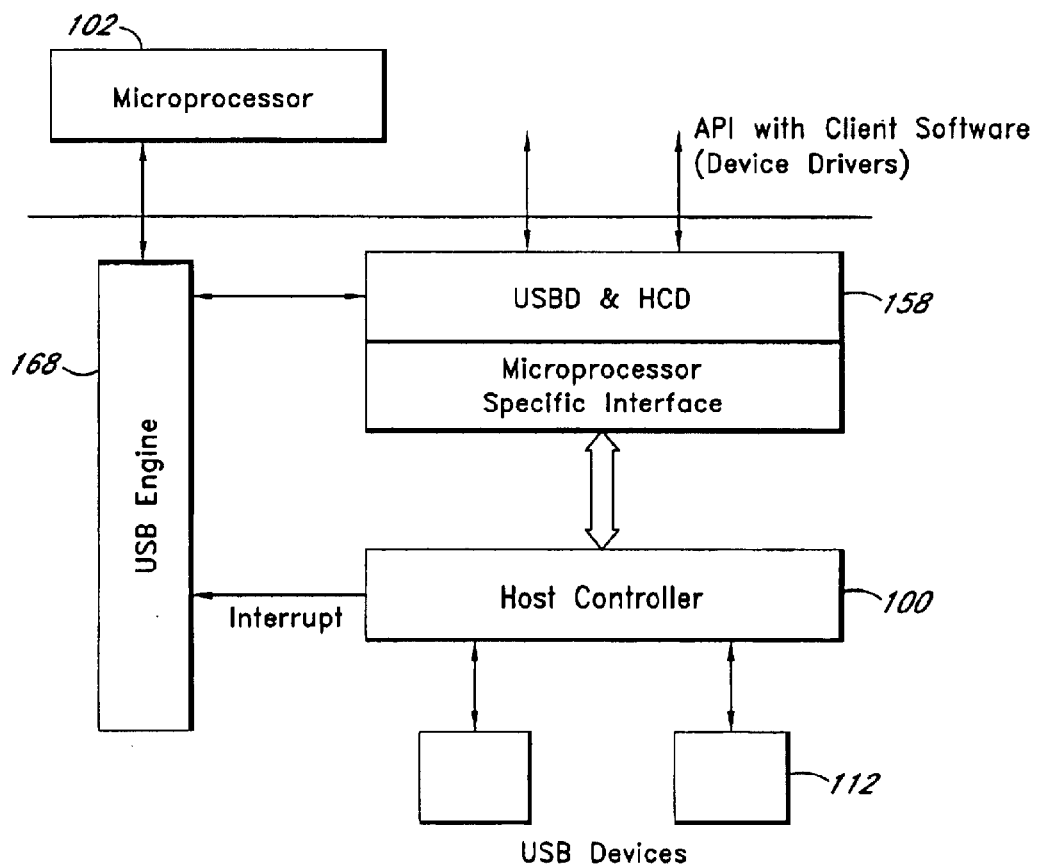
FIG. 9b is a block diagram of an API to client software interface.

The host controller system 100 also comprises a control memory (CM) 106 which provides some of the functionality of the batch memory 30 of FIG. 1A. The CM 106 can store a plurality of Transaction Descriptors (XDs) 110 each of which holds the control and status information for carrying out a transaction to an endpoint of a USB device 112 (FIGS. 9a and 9b). Each XD 110 can be selected or de-selected for dispatch. The selected XDs 110 are executed in sequence.

The host controller system 100 also comprises a host controller logic unit 114. The host controller logic unit 114 provides the functionality of the host logic unit 22 in FIG. 1A. A batch of transactions is assembled by the microprocessor 24 writing a plurality of XDs 110 in the CM 106 in the manner that will be described in greater detail below. The interrupt condition for each XD 110 can be specified individually as discussed above.

In this implementation, each batch may comprise up to 16 USB transactions. The host controller system 100 allows spill over of USB transactions to the next frame in the manner described above in connection with FIG. 3B. The host controller logic unit 114 can thus XDs and data from the microprocessor 24 and execute batches in the CM 106 and data memory 116 simultaneously to improve the efficiency of operation of the host controller system 100. If the transactions scheduled for dispatch can not be completed in the current frame, they will be completed at the beginning of the next frame. However, in scheduling the transactions, the host software should consider the time remaining in a frame if there are frame sensitive isochronous and interrupt transactions.

The host controller system 100 also comprises data memory (DM) 116 that also provides the functionality of the batch memory 30 of FIG. 1. The data memory 116 allows double or multiple buffering to maximize the data rate. While data is being transferred from one part of the data memory 116, the host microprocessor 24 can write or read other parts of the data memory 116 to prepare for the next batch of USB transaction or next frame in the previously described manner.

In one embodiment of this invention, there are four interrupt modes which provide a developer the flexibility to balance high data rate and demand on microprocessor 102 resources.

In the Batch Complete (BC) interrupt mode, the host microprocessor 24 is only interrupted once after a batch of USB transactions are completed in the manner described above in connection with FIGS. 3A and 3B. In one batch, the microprocessor 24 can schedule a plurality of transactions by writing XDs 110 in the CM 106, and data in the DM if needed. A batch can be scheduled within a frame to reach the maximum USB 1.1 full speed data rate. For example, five transactions can be scheduled for a total of 1,280 bytes in one ms: one isochronous transaction of 1023 bytes, and four bulk or interrupt transactions of 64 bytes each.

In the Transaction Error/NAK (XTE) interrupt mode, the batch is stopped and an interrupt is generated upon the error condition of a transaction, or NAK from a device.

In the Transaction Successful (XTS) interrupt mode, an interrupt is generated immediately upon the successful completion of a batch transaction.

In the Transaction Done (XTD) interrupt mode, the batch is stopped and an interrupt is generated after a USB transaction is dispatched regardless of its outcome.

By choosing among the BC, XTE, XTS and XTD modes, a developer has the flexibility to stop the batch based on the outcome of any of the plural XDs 110.

Figure 8:
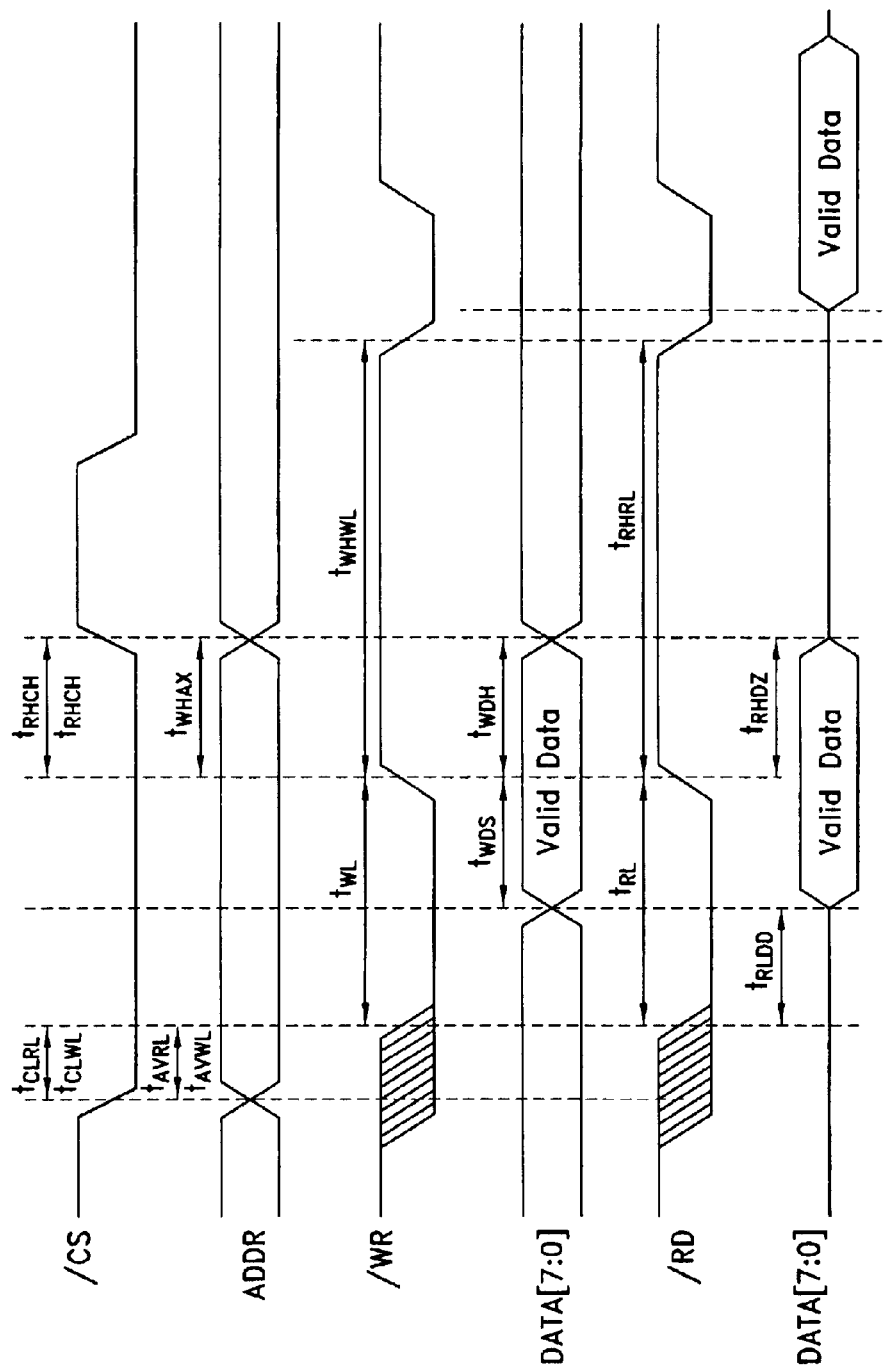
FIG. 8 shows a timing diagram for the host controller of FIG. 5.

The memory map of one embodiment of this host controller system 100 is shown in FIG. 6. In this embodiment, the CM 106 is assumed to be 256 bytes holding 16 transaction descriptors 110, and the data memory 116 is assumed to be 2K bytes thereby providing sufficient capacity for double buffering. A larger control memory 106 and a larger data memory 116 will allow more transactions in a batch and multiple buffering. FIG. 8 shows a detailed the timing diagram of one embodiment of the host controller system 100.

Control Registers

The read/write access to the bits of each Register by both the host controller driver (HCD) software and the host controller system 100 are specified as follows.

UhcControl Register

The UhcControl Register defines the operating modes for the host controller system 100 and is used by the host controller driver software to execute commands such as sending USB reset, suspending the host controller system 100, and to move the host controller system 100 from one state to another. Bits [4.1] define the Host Controller Function States (HCFS).

This register is used by the HCD to send commands to the host controller system 100 and by the host controller system 100 to report its states to the HCD. The HCD writes to a bit of this register to change the HCFS or dispatch a batch of transactions. The HCFS may be changed by the host controller system 100 hardware only when in the USBSUSPEND state. The host controller system 100 moves from the USBSUSPEND state to the USBRESUME state after detecting the resume signaling from a downstream port 122. The HCD reads this register to find out the state of the host controller system 100. The HCFS bits are effective only when the power saving mode is off (PowerSavingOff=1). The user should read this register if confirmation of the state of the host controller system 100 is desired after a write to the HCFS bits.

Figure 7:
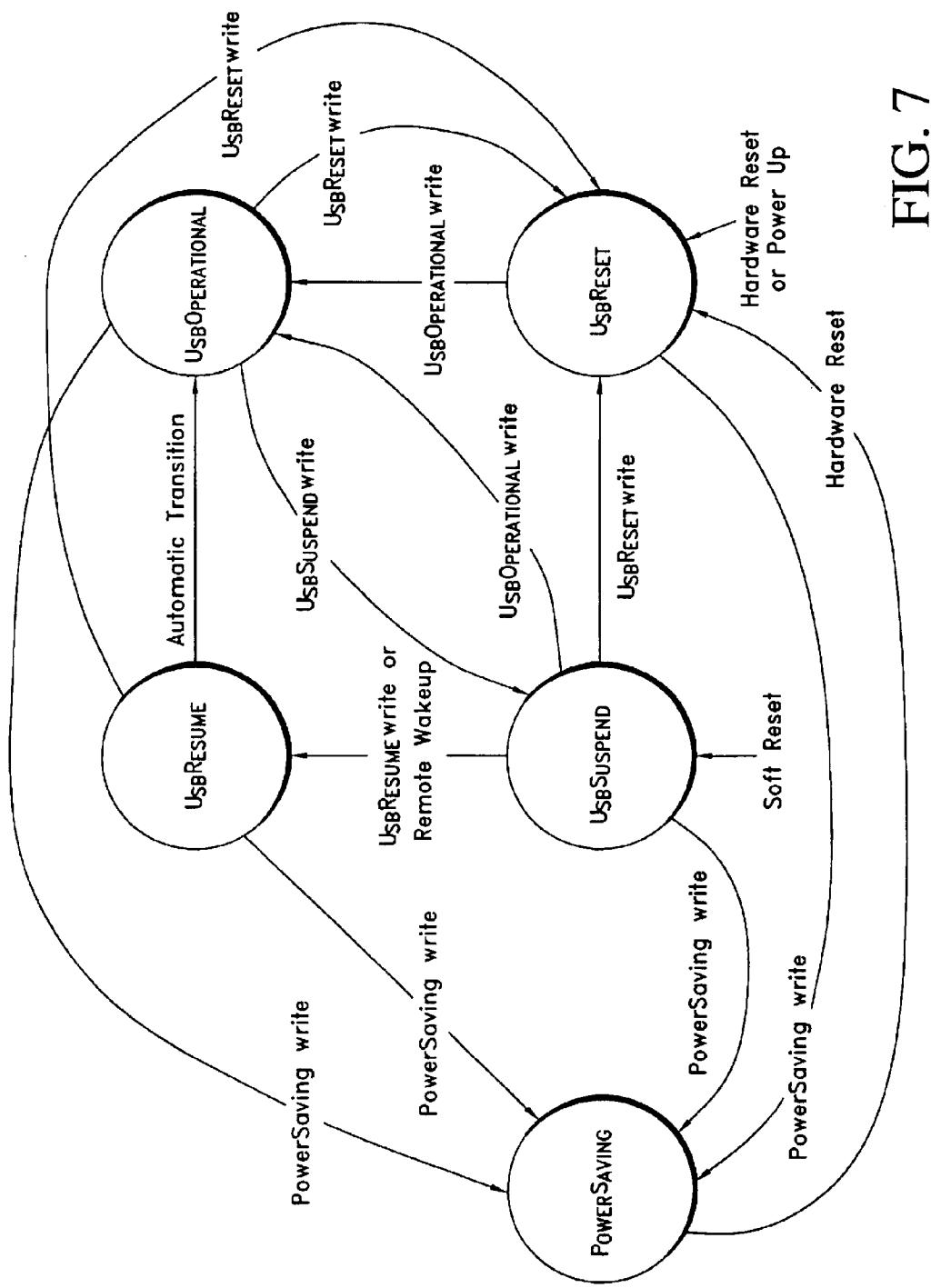
FIG. 7 illustrates the host controller state transitions implemented by the host controller system of FIG. 5.

The HCD may only write 1 to one bit of this register at a time. Writing 1's to more than one bits will be ignored. Writing 0's to this register has no effect. Only valid transitions as shown in FIG. 7 are accepted. Commands for invalid transitions will be ignored.

Register Address: Low byte: 000h
High byte: 001h
Read/Write

| Bit | Default | HCD | HC | Description |
|---|---|---|---|---|
| 15..8 | 00h | | | Reserved |
| 7 | 0b | R/W | R | PowerSaving
When this bit is set to 1, regardless of the current states, the host controller system 100 goes into power saving mode. In the power saving mode, the host controller system 100 stops the clock. To exit the PowerSaving mode, the HCD must assert the /RESET pin of the host controller system 100 (>200 ns) which will restart the clock and put the host controller system 100 into USBRESET state. |
| 6 | 0b | | | Reserved |
| 5 | 0b | R/W | R/W | SoftReset
This bit is set by the HCD to initiate a software reset[1] of the host controller system 100. Setting this bit will move the host controller system 100 to the USBSUSPEND state and resets internal timers, counters, state machines, etc. to their initial value. Any batch currently in progress is terminated and no host bus accesses are allowed. This bit, when set, will not cause a reset to the root hub 120 and no subsequent reset signaling are asserted to the downstream ports 122. This bit is cleared by the host controller system 100 upon the completion of the soft reset operation. As a result, this bit will always be 0 when read. |
| 4 | 1b | R/W | R/W | USBRESET:
The HCD may set this bit to 1 to reset all host registers, state machines, and the root hub 120 and assert subsequent USB reset signaling (SE0) to all downstream ports 122. Writing USBRESET is equivalent to a hardware reset[2]. The host controller system 100 sets USBRESET to 1 after a hardware reset. The HCD must ensure that the host controller system 100 remain in USBRESET for a minimum of 50 ms (per USB Specification 1.1) once it enters this state. |
| 3 | 0b | R/W | R | USBSUSPEND:
Setting USBSUSPEND to 1 will disable transaction dispatching and SOF generation. When the host controller system 100 is in USBOPERATIONAL, if there is a batch in progress, it enters USBSUSPEND after the batch is finished. While USBSUSPEND is set to 1, upon detecting a Remote Wakeup from a |

| Bit | Default | HCD | HC | Description |
|---|---|---|---|---|
| | | | | downstream device, the host controller system 100 will send the USB resume signal downstream for 20 ms. The host controller system 100 sets USBSUSPEND to 1 after a SoftReset. |
| 2 | 0b | R/W | R/W | USBRESUME: When USBRESUME is set to 1, the host controller system 100 sends USB Resume signal downstream for 20 ms. Transaction dispatching and SOF are disabled, and writes to the UhcControl register by HCD are ignored while USBRESUME is set. The host controller system 100 will set USBRESUME to 1 upon detection of a Remote Wakeup signal from downstream. |
| 1 | 0b | R/W | R/W | USBOPERATIONAL: Setting USBOPERATIONAL to 1 will cause SOF generation to begin 1 ms later and enable dispatch of transactions 60 on USB. The HCD may determine whether the host controller system 100 has begun sending SOFs by reading the StartOfFrame bit of HcInterruptStatus. |
| 0 | 0b | R/W | R/W | BatchDispatch: The HCD sets this bit to dispatch the batch of transactions 60 selected by the UhcTransactionSelect Register. The number of transactions 60 scheduled for dispatch in a batch may be any number from 1 to 16 in this embodiment. The host controller system 100 dispatches a transaction associated with the ith Transaction Descriptor (XD) 110 in the Control Memory (CM) 106 if all of the following conditions are true: UhcControl[BatchDispatch] = 1; UhcControl[USBOPERATIONAL] = 1; UhcTransactionSelect[i] = 1; and The time remaining in the frame is sufficient to complete the transaction[3]. The transactions 60 selected by the UhcTransactionSelect Register are dispatched in the order of XD0, XD1, XD2, . . . , XDF. UhcTransactionSelect[i] corresponds to XDi located at address (400h + i × 010h) to (400h + i × 010h + 00Fh) of the CM 106 where i = 0, 1, 2, . . . , Fh. The host controller system 100 clears this bit when batch processing ends. Batch processing ends if any one of the following occurs: 1. All the selected transactions 60 have been completed; or 2. A stop condition for an XD 110 is met (See StopOnAck and StopOnNoAck bits of XDControl in the next section). 3. HCD writes the USBRESET bit. An interrupt will be generated if the interrupt corresponding to the condition is enabled. The cause of the interrupt may be found in UhcInterruptStatus register and XDStatus field in the CM 106. The HCD can only set this bit and cannot clear this bit. |

[1] Software Reset: A software reset is done by writing a 1 to the SoftReset bit of the UhcControl Register. It moves the host controller system 100 to the USBSUSPEND state and resets internal timers, counters, state machines, etc. to their initial value, no matter what functional state the host controller system 100 may be at. A batch currently in progress is terminated and no host bus accesses are allowed.

[2] Hardware Reset: A hardware reset is done at power up and when the /RESET pin of the host controller system 100 is asserted. It moves the host controller system 100 to the USBRESET state and resets internal timers, counters, state machines, etc. to their initial value, no matter what functional state the host controller system 100 may be at. Any transaction currently in progress on USB is immediately terminated and no host bus accesses are allowed. It also causes areset to the root hub 120 and subsequent reset signaling to the downstream ports 122.

-continued

Register Address: Low byte: 000h
                  High byte: 001h
                  Read/Write Bit   Default   HCD   HC   Description

[3] Whether there is sufficient time to dispatch a transaction is determined by the size of the packets in the transaction, the speed of the device, the contents of the UhcFmRemaining Register and the maximum protocol overhead for the transaction. See the description of these Registers for more details.

UhcTransactionSelect Register

Register Address:        Low byte: 002h
                         High byte: 003h The HCD sets the bit to select the transaction for dispatch. When the ith bit is set and UhcControl[BatchDispatch]=1, the host controller system 100 dispatches the transaction associated with the ith XD 110 located at 400h+i×010h in ascending order from i=0 to 15d.

UhcBatchStatus Register

Register Address:        Low byte: 004h
                         High byte: 005h When the UhcControl[BatchDispatch] bit is set, the host controller system 100 clears all bits of the UhcBatchStatus to zero before dispatching any transaction. UhcBatchStatus [i] is set when the transaction associated with the ith XD 110 is dispatched. After UhcControl[BatchDispatch] transitions from 1 to 0, the status of the ith XD 110 is determined by UhcTransactionSelect[i] and UhcBatchStatus[i] as follows:

| UhcTransactionSelect[i] | UhcBatchStatus [i] | Transaction Status |
|---|---|---|
| 0 | 0 | Transaction associated with the ith XD 110 was not selected for dispatch. |
| 1 | 1 | Transaction associated with the ith XD 110 was selected for dispatch, and has been dispatched. Status of the transaction is in the ith XDTransactionStatus Register in CM 106. |
| 1 | 0 | Transaction associated with the ith XD 110 was selected for dispatch, but has not been dispatched due to insufficient time in the frame or host controller system 100 not in USBOPERATIONAL state or host errors. |

UhcInterruptStatus Register

Register Address: 006h

This register provides status on various host controller system 100 level events that cause hardware interrupts. When an event occurs, the host controller system 100 sets the corresponding bit in this register. When a bit becomes set, a hardware interrupt is generated if the interrupt is enabled in the UThcInterruptEnable register and the MasterInterruptEnable bit is set. The host controller system 100 does not clear the bits in this register except bit 1, BatchIncomplete. The HCD clears the bits in this register by writing '1' to bit positions to be cleared. The HCD may not set any of these bits.

Read/Write

| Bit | Default | HCD | HC | Description |
|---|---|---|---|---|
| 7 | 0b | R/W | R/W | BatchStopped The host controller system 100 sets this bit when the batch is stopped by a XD 110 stops after its completion. See XDControl in the next section. This bit is cleared when UhcControl[BatchDispatch] is set. |
| 6 | 0b | R/W | R/W | BatchCompleted The host controller system 100 sets this bit when all selected XDs 110 have been dispatched. This bit is cleared when UhcControl[BatchDispatch] is set. |
| 5..4 | 00b | | | Reserved |
| 3 | 0b | R/W | R/W | HostError This bit is set when the host controller system 100 detects a host error not related to USB. The host controller system 100 should not proceed with any processing nor signaling before the system error has been corrected. The HCD clears this bit after the host controller system 100 has been reset. |
| 2 | 0b | R/W | R/W | ResumeDetected When UCH124 is in USBSUSPEND state, it sets this bit when remote wakeup signal from a device on the USB is detected. Transition from no resume signaling to resume signaling causes this bit to be set. This bit is not set when the HCD sets the USBRESUME bit in UhcControl. |
| 1 | 0b | R/W | R/W | RootHubStatusChange The host controller system 100 sets this bit when there is any change in the status of the root hub 120 or status of any of the ports 122 of the root hub 120. This enables automatic detection of hot-plug. Host software may poll the status registers in the root hub 120 to find out what caused the changes. |
| 0 | 0b | R | R/W | StartOfFrame This bit is set by the host controller system 100 at the start of each frame and after the update of UhcFrameNumber Register. The host controller system 100 also generates a SOF token at the same time. |

UhcInterruptEnable Register

Register Address: 007h

This register enables and disables reporting of the corresponding interrupt to the HCD. When a bit is set and the corresponding interrupt is active, an interrupt is generated to the host. Interrupt sources that are disabled in this register still appear in the UhcInterruptStatus Register to allow the software to poll for events.

Each enable bit in the UhcInterruptEnable register corresponds to an associated interrupt bit in the UhcInterruptStatus Register. The UlhcInterruptEnable register is used to control which events generate a hardware interrupt. When a bit is set in the UhcInterruptStatus register AND the corresponding bit in the UhcInterruptEnable register is set AND the MasterInterruptEnable bit is set, then a hardware interrupt is requested on the host bus.

| | | Read/Write | | |
|---|---|---|---|---|
| Bit | Default | HCD | HC | Description |
| 7 | 0b | R/W | R | BatchStopped Interrupt 1 - Enable; 0 - Disable. |
| 6 | 0b | R/W | R | BatchCompleted Interrupt 1 - Enable; 0 - Disable. |
| 5..4 | 00b | | | Reserved |
| 3 | 0b | R/W | R | HostError Interrupt 1 - Enable; 0 - Disable. |
| 2 | 0b | R/W | R | ResumeDetect Interrupt 1 - Enable; 0 - Disable. |
| 1 | 0b | R/W | R | RootHubStatusChange Interrupt 1 - Enable; 0 - Disable. |
| 0 | 0b | R/W | R | StartOfFrame Interrupt 1 - Enable; 0 - Disable. The HCD should set this bit if the USB host requires an interrupt every frame in order to process the queue of USB transfers and schedule transactions 60 for a frame. |

UhcFmInterval Register

Register Address: Low byte: 008h
High byte: 009h

When reading this register, the HCD must read the low byte (008h) first.

Bits [13:0] of the UhcFmInterval Register stores the length of a USB frame in 12-MHz bit times. The UhcFmInterval register and the UhcFmRemaining register together define frame boundaries. This register can be used to adjust out any offset from the clock source that generates the clock that drives the SOF counter. It can also be used to maintain real time synchronization with the rest of the system so that all devices have the same sense of real time.

| | | Read/Write | | |
|---|---|---|---|---|
| Bit | Default | HCD | HC | Description |
| 15...14 | | | | Reserved |
| 13..0 | 2EDFh | R/W | R | FrameInterval The value of the FrameInterval corresponds to (Frame Length − 1) bit times. The FrameInterval is loaded with a default value of 2EDFh (11,999 decimal) at reset. This value produces a USB frame comprising exactly 12,000 bit times. The HCD may vary the value of FrameInterval at any time. Its value will take effect from the beginning of the next frame. This Register is reset upon a host controller system 100 Reset or Global Reset. The HCD must maintain a copy of its value for reprogramming if necessary. |

-continued

| | | Read/Write | | |
|---|---|---|---|---|
| Bit | Default | HCD | HC | Description |

UhcFmRemaining Register

Register Address: Low byte: 00Ah
High byte: 00Bh

This register is a 14-bit frame counter. When reading this register, the HCD must read the low byte (00Ah) first.

| | | Read/Write | | |
|---|---|---|---|---|
| Bit | Default | HCD | HC | Description |
| 15...14 | | | | Reserved |
| 13..0 | 0h | R | R/W | FrameRemaining When operating, the FrameRemaining value decrements once per full speed USB bit time. When FrameRemaining reaches a value of 0, it is loaded with the value of the FrameInterval at the next bit-time boundary. The frame boundary is the bit boundary on which the value of FrameRemaining transitions from 0 to FrameInterval. |

UhcFmNumber Register

Register Address: Low byte: 00Ch
High byte: 00Dh

This Register is an 11 bit counter. When reading this Register, the HCD must read the low byte (00Ch) first.

| | | Read/Write | | |
|---|---|---|---|---|
| Bit | Default | HCD | HC | Description |
| 15..11 | | | | Reserved |
| 10..0 | 0h | R | R/W | FrameNumber This is the current frame number which is sent over the USB as the Frame Number field in SOF Tokens. It is incremented by the host controller system 100 at each frame boundary when the FrameRemaining field transitions from 0 to FrameInterval. Immediately following the change in value of FrameNumber at the beginning of the frame, the host controller system 100 sets the StartOfFrame bit in the UhcInterruptStatus Register to signify a StartOfFrame interrupt event. |

Transaction Descriptors 110 in the Control Memory 106 The 256 bytes of the memory space starting from 400h are reserved as Control Memory (CM) 106. The CM 106 holds 16 Transaction Descriptors (XD) 110 denoted as XD1, XD2, . . ., XDF. Each XD 110 comprises the following fields:

XDControl
XDStatus
XDDevAddress
XDEndpoint
XDBufAddress
XDBufLength
XDXferCount

At run time, the selected XDs 110 are loaded one at a time for batch dispatching. When BatchDispatch=1, the HCD should not access any of the XDs 110 selected for dispatch.

XDControl

Memory Address: (400h+i×10h) where i=0,1,2, . . . 15d.

The HCD defines the type and parameters of a transaction using this field.

| Bit | Description |
|---|---|
| 7 | StopOnSucc:<br>When this bit is set, the current batch is stopped after this XD 110 if the transaction is successfully completed. For IN, this means that the device returned a data packet to the host and there is no error. For SETUP and non-isochronous OUT, this means that the host received an ACK from the device. For isochronous OUT, the transaction is always considered successfully completed after it is dispatched. If the batch is to be always continued after this transaction, set bits 7 . . . 5 to 000. If the batch is to be stopped after this transaction regardless of its outcome, set bits 7 . . . 5 to 111. |
| 6 | StopOnNak:<br>When this bit is set, the current batch is stopped after this XD 110 if the device responds with a NAK. |
| 5 | StopOnFail:<br>When this bit is set, the current batch is stopped after this XD 110 if the device returns STALL, or the device does not respond with 18 bit times (timeout) or there is error in packets returned by the device. |
| 4 | Speed:<br>Full Speed: XDSpeed = 0;<br>Low Speed: XDSpeed = 1. |
| 3 | Iso:<br>This bit is set to 1 if the transaction is isochronous. |
| 2 | DataSeq:<br>This bit is used only for OUT transfers.<br>XDDataSeq = 0: DATA0 packet<br>XDDataSeq = 1: DATA1 packet<br>This bit is irrelevant for isochronous transactions. |
| 1:0 | PID:<br>00: SETUP<br>01: OUT (Host to Device)<br>10: IN (Device to Host)<br>11: Reserved |

XDStatus

Memory Address: (400h + i × 10h + 1) where i = 0,1,2, . . . 15d.

The host controller system 100 stores the status of the transaction in this field after it is completed. After a batch is completed or stopped, the HCD may read this byte to find the status of the corresponding transaction. When the Batch-Dispatch bit is 1, the contents of this byte is meaningless. There are a total of a 16 XDStatus fields in this embodiment, referred to as XDStatus0, XDStatus1, . . . , XDStatusF.

| Bit | Description |
|---|---|
| 7 | Reserved |
| 6 | Stall:<br>This bit is set by the host controller system 100 when it receives a STALL from the device endpoint. |
| 5 | Error:<br>This bit is set by the host controller system 100 when there is CRC check error or DATA0/1 PID check error in an IN transaction. This bit is irrelevant for SETUP and OUT transactions. |
| 4 | Overflow<br>This bit is set by the host controller system 100 when it receives more data from a device than that indicated by XDBufLength. |
| 3 | Timeout<br>This bit is set by the host controller system 100 when it fails to receive any response from the device 18 bit times after the IN token packet or 18 bit times after the data packet in a SETUP or OUT transaction. |
| 2 | NAK:<br>The bit is set by the host controller system 100 when it receives a NAK from the device. |
| 1 | InDataSeq:<br>This bit is set by host controller system 100 in an IN transaction.<br>InDataSeq = 0 if a DATA0 packet is received;<br>InDataSeq = 1 if a DATA1 packet is received.<br>This bit is irrelevant for OUT and isochronous transactions. |
| 0 | ACK<br>This bit is set by the host controller system 100 when the host controller system 100 receives an ACK from the device. |

XDDevAddress

Memory Address: (400h + i × 10h + 2) where i = 0, 1, 2, . . . 15d.

| | |
|---|---|
| 7 | Reserved |
| 6 . . . 0 | DevAddress<br>This is the 7-bit address of the device targeted by the XD 110. |

XDEndpoint

Memory Address: (400h + i × 10h + 3) where i = 0, 1, 2, . . . 15d.

| | |
|---|---|
| 7 . . . 4 | Reserved |
| 3 . . . 0 | Endpoint<br>This is the 4-bit number of the endpoint targeted by the XD 110. |

XDBufAddress

Memory Address: (400h + i × 10h + 4) and (400h + i × 10h + 5) where i = 0, 1, 2, . . . 15d.

| | |
|---|---|
| 15 . . . 11 | Reserved |
| 10 . . . 0 | BufAddress<br>This is the address of the data for the transaction in the 2K bytes of data memory 116. |

XDBufLength

Memory Address: (400h + i × 10h + 6) and (400h + i × 10h + 7) where i = 0, 1, 2, . . . 15d.

| | |
|---|---|
| 15 . . . 10 | Reserved |
| 9 . . . 0 | BufLength<br>This is the length of the data for the transaction. |

XDXferCount

Memory Address: (400h + i × 10h + 8h) and (400h + i × 10h + 9h) where i = 0, 1, 2, . . . 15d.

The host controller system 100 writes this field after the completion of the corresponding transaction.

| Bit | Description |
|---|---|
| 15 . . . 10 | Reserved |
| 9 . . . 0 | XferCount<br>This is the result of a down counter. At the beginning of the transaction, the host controller system 100 loads the down counter with the value of the BufLength. The down counter is decremented by 1 for every byte transferred. If more bytes that that indicated by BufLength are transferred, the host controller system 100 sets the XferCount to 0 and the Overflow bit in the XDStatus field is set.<br>This field should only be read when the batch is finished (BatchDispatch = 0). |

Root Hub 120 Ports and Endpoints

The host controller system 100 also comprises a root hub 120 (FIG. 5). The root hub 120 of this embodiment is a USB Specification compliant 4-port hub. The root hub 120 supports the following descriptors: Device Descriptor, Configuration Descriptor, Interface Descriptor, Endpoint Descriptor, and Hub Descriptor. These descriptors are described in detail in USB Specification. Standard USB Device Requests and class-specific Hub Requests are also supported, including ClearHubFeature, ClearPortFeature, GetBusState, GetHubDescriptor, GetHubStatus, GetPortStatus, SetHubDescriptor, SetHubFeature, and SetPortFeature.

USB Ports

The root hub 120 of this embodiment has four downstream ports 122. The four downstream ports of the root hub 120 support both full speed as well as low speed USB devices 112. 15 KΩ pull-down resistors are required at the inputs of the downstream ports 122. Full speed signal requirements demand controlled rise/fall times and impedance matching of the USB ports. To meet these requirements, 22 Ω resistors must be inserted in series between the USB data pins and the USB connectors.

USB devices 112 attached to the downstream ports 122 are determined to be either full speed or low speed depending which data line (DP or DM) is pulled high. If a downstream port 122 is enumerated as low speed, its output buffers operate at a slew rate of 75–300 ns, and the root hub 120 will not propagate any traffic to that port 122 unless it is prefaced with a preamble PID. Low speed data following the preamble PID is propagated to both low and full speed USB devices 112. The root hub 120 will enable low speed drivers within four full-speed bit times of the last bit of a preamble PID, and will disable them at the end of an EOP.

All the downstream ports 122 independently drive and monitor their DP and DM pins so that they are able to detect and generate the 'J', 'K', and SE0 bus signaling states. Each port 122 has single-ended and differential receivers on its DP and DM lines.

Port Power Management

Overcurrent sensing is on a per port 122 basis and is achieved through the OVCx pins. Whenever the voltage at OVCx is asserted, the root hub 120 treats it as an overcurrent condition. This could be caused by an overload, or even a short circuit, and causes the root hub 120 to set the PORT_OVER_CURRENT status bit and its C_PORT_OVER_CURRENT status change bit. At the same time, power to the offending port 122 is shut off.

An external device is needed to perform the actual switching of the port 122 power under control of the root hub 120. The signals to control the external switches are the PWRx pins that are open drain signals and require external pull-up resistors of 100 KΩ. Any type of suitable switch or device is acceptable. However, it should have a low voltage drop across it even when the port 122 absorbs full power. In its simplest form this switch can be a P-channel MOSFET. One advantage of using a MOSFET switch is its very low voltage drop and low cost.

Each one of the ports 122 has its own power control pin which is asserted only when a SetPortFeature[PORT-POWER] request is received from the HCD. PWRX is de-asserted under the following conditions:
1. Power up
2. Reset and initialization
3. Overcurrent condition
4. Requested by the HCD through a ClearPortFeature [PORT POWER].

Hub Controller

The root hub 120 comprises a hub controller 124. The hub controller 124 provides the mechanism for the HCD to enumerate the root hub 120 and for the root hub 120 to provide the HCD with its configuration information. The hub controller 124 also provides a mechanism for the HCD to monitor and control the downstream ports 122. Power is applied, on a per port 122 basis, by the hub controller 124 upon receiving a command, SetPortFeature[PORT_POWER], from the HCD. The root hub 120 must be configured first by the HCD before the hub controller 124 can apply power to external devices.

The hub controller 124 contains two endpoints, Endpoint0 and Endpoint1 and maintains a status register, Controller Status Register, which reflects the root hub 120 current settings. At power up, all bits in this register will be set to 0's.

Endpoint 0

Endpoint 0 is the root hub 120 default endpoint used for enumeration of the root hub 120 and exchange of configuration information and requests between the HCD and the root hub 120. Endpoint 0 supports control transfers. Standard USB Device Requests and class-specific Hub Requests are supported through Endpoint 0. There is no endpoint descriptor for Endpoint0.

Endpoint 1

Endpoint1, an interrupt endpoint, is used by the hub controller 124 to send status change information to the HCD. The hub controller 124 samples the changes at the end of every frame at time marker EOF2 in preparation for a potential data transfer in the subsequent frame. The sampled information is stored in a byte wide register, the Status Change Register, using a bitmap scheme.

Each bit in the Status Change Register corresponds to one port 122 as indicated in the following table.

| Bit | Function | Value | Description |
|-----|----------|-------|-------------|
| 0 | Hub status change | 0 | No change in status |
|   |                   | 1 | Change in status detected |
| 1 | Port1 status change | 0 | No change in status |
|   |                     | 1 | Change in status detected |
| 2 | Port2 status change | 0 | No change in status |
|   |                     | 1 | Change in status detected |
| 3 | Port3 status change | 0 | No change in status |
|   |                     | 1 | Change in status detected |
| 4 | Port4 status change | 0 | No change in status |
|   |                     | 1 | Change in status detected |
| 5–7 | Reserved | 000 | Default values |

An IN Token packet from the Host to Endpoint 1 indicates a request for port change status. If the root hub 120 has not detected any change on its ports 122, or any changes in itself, then all bits in this register will be 0 and the hub controller 124 will return a NAK to requests on Endpoint1. If any of bits 0–4 is 1, the hub controller 124 will transfer the whole byte. The hub controller 124 will continue to report a status change when polled until that particular change has been removed by a ClearPortFeature request from the HCD. No status change will be reported by Endpoint 1 until the root hub 120 has been enumerated and configured by the HCD via Endpoint 0.

The host controller system 100 also comprises a phase locked loop (PLL) 126. The PLL 126 generates from a single oscillator 6 MHz, 12 MHz, and 48 MHz clocking signals for the host controller system 100. The PLL 126 generates minimal electro-magnetic interference and in this embodiment is integrated on the same chip as the host controller system 100.

The host controller system 100 also comprises a host serial interface engine (SIE) 130. The SIE 130 interconnects the host controller logic unit 114 and the root hub 120. The SIE 130 buffers USB data bits and maintains state of data toggle bits. The SIE 130 receives a 48 MHz clocking signal from the PLL 126 to synchronize clocks.

Host Controller States

Valid states and state transitions of the host controller system 100 are shown in FIG. 7.

USBoperational

When in the USBOPERATIONAL state, the host controller system 100 will generate SOF and enable dispatch of selected XDs 110. The USBOPERATIONAL state may be entered from the USBRESUME or USBRESET states. It may be exited to the USBRESET or USBSUSPEND or POWERSAVING states. The host controller system 100 enters USBOPERATIONAL from USBRESUME automatically after satisfying the USB Resume timing (20 ms).

USBRESET

The host controller system 100 enters this state upon power up and hardware reset, and from USBOPERATIONAL and USBSUSPEND immediately upon USBRESET write. When in the USBRESET state, all downstream ports 122 of the root hub 120 in host controller system 100 will be in the SE0 state, resetting all downstream devices until the root hub 120 is configured following a USBOPERATIONAL write by the HCD. The HCD must ensure that the host controller system 100 remain in USBRESET for a minimum 50 ms (per USB Specification 1.1) once it enters this state.

USBSUSPEND

USBSUSPEND is entered following a software reset or from the USBOPERATIONAL state on a USBSUSPEND write by HCD. When the host controller system 100 is in USBOPERATIONAL, if there is a batch in progress, it enters USBSUSPEND after batch is finished. When the host controller system 100 is in USBSUSPEND, XD dispatching and SOF token generation are disabled. While in USBSUSPEND, upon detecting a Remote Wakeup from a downstream USB device 112, the host controller system 100 will send the USB Resume signal downstream for 20 ms. If the HCD writes a 1 to USBRESET while the host controller system 100 is in USBRESUME, the USBRESET write will be ignored.

Normally, the HCD must ensure that the host controller system 100 stays in this state for at least 5 ms and then exits this state to either the USBRESUME or the USBRESET state. One exception is when USBSUSPEND is entered due to a soft reset and the previous state was USBOPERATIONAL. In that case, if the host controller system 100 remains in the USBSUSPEND state for less than 1 ms, it may exit directly to USBOPERATIONAL.

While in USBSUSPEND, the host controller system 100 may force a transition to the USBRESUME state due to a remote wakeup condition. This transition may conflict with the HCD initiating a transition to the USBRESET state. If this situation occurs, the UHC will transition to USBRESET state.

USBRESUME

Upon a USBRESUME write, the host controller system 100 sends USB Resume signal downstream for 20 ms. While the host controller system 100 is in the USBRESUME state, writes to the UhcControl register by the HCD is ignored. XD dispatching and SOF Token generation are disabled while in USBRESUME. USBRESUME is only entered from USBSUSPEND. The transition to USBRESUME can be initiated by a USBRESUME write to the UhcControl register, or by a Remote Wakeup signal from downstream.

POWERSAVING

Upon a POWERSAVING write, the host controller system 100 enters into POWERSAVING state. In POWERSAVING, the host controller system 100 stops its clock. Thus, the host controller system 100 can not be awakened by a remote wakeup event when it is in POWERSAVING state. The only way to exit the POWERSAVING state is for the microprocessor to assert the /RESET pin of the host controller system 100 (>200 ns), upon which the host controller system 100 enters the USBRESET state.

Host Controller Driver Interface

The host controller system 100 does not have a bus mastering ability as in a PCI bus in the Universal Host Controller Interface (UHCI) or the Open Host Controller Interface (OHCI). However, the USB host stack (i.e., USB Driver and Host Controller Driver) in many operating systems is designed to operate with a host controller system that does have bus mastering capabilities. For example, using UHCI or OHCI interfaces, data can be moved between the system memories in response to signals from the host controller as the system bus can be slaved to the host controller. As discussed above, however, with embedded systems, the system bus is only under the control of the host microprocessor. Hence, such host stack are often not able to be used with such embedded USB systems.

To address this problem, the present invention uses an interrupt-driven USB Engine 168 in conjunction with the host controller system 100 described above. The host controller system 1000 is programmed so as to send interrupts to host microprocessor so that the host microprocessor can use an interrupt handler to transfer data between the system memory and the host controller system 100 in response to interrupt signal generated by the host controller system 100. In this way, data transfer between the host controller system 100 and the system memory occurs without the intervention of the higher-layer of the HCD, the USB driver and the client software as if the host controller system 100 has bus mastering. USB host stacks designed for OHCI or UHCI host controllers with bus mastering can then be used with embedded USB host controller systems that do not have r bus mastering capability.

More specifically, in one embodiment shown in FIG. 9a, the USB Engine 168 makes use of the interrupt from the host controller system 100 to activate an interrupt handler routine which pushes transaction descriptors 110 and data from the microprocessor 102 system memory to the host controller system 100 memory and pulls transaction status and data from the host controller system 100 memory to the microprocessor 102 system memory. This invention is able to provide an OHCI or UHCI interface to the HCD without requiring bus mastering ability as in a PCI bus controller. Using this invention, USB host stack that is written for an operating system and OHCI or UHCI type of host controllers requiring bus mastering may be interfaced directly with the embedded host controller system 100 which does not have bus mastering. The host controller system 100 will appear as an OHCI or UHCI to an operating system that has OHCI or UHCI USB host support such as Windows CE. In essence, the USB Engine 168 makes use of the interrupt from the host controller system 100 to activate an interrupt handler routine to handle the bidirectional communication between the microprocessor memory and the host controller system 100 to accomplish the same objective in a bus mastering bus.

In OHCI, there is a segment in shared main memory, called Host Controller Communications Area (HCCA), established by the HCD and is used for communication between the HCD and the host controller system 100. There are two communication channels between the host controller system 100 and the HCD. The first channel uses the registers located in the host controller system 100. It may also use a segment of the microprocessor 102 memory to control the functions of the host controller system 100. The USB Engine 168 shown in FIG. 9*a* makes use of the interrupt from the host controller system 100 to activate an interrupt handler routine to handle this communication channel by pushing data to the control registers of the host controller system 100 and the said segment of the microprocessor 102 memory. The USB Engine 168 also maintains a pointer to the HCCA in the system memory. The HCCA is the second communication channel. The USB Engine 168 makes use of the interrupt from the host controller system 100 to activate an interrupt handler routine to handle this channel which may be bidirectional. The HCCA contains the head pointers to the interrupt Endpoint Descriptor lists, the head pointer to the done queue, and status information associated with start-of-frame processing.

In UHCI, the UHCI data structures include a Frame List, Isochronous Transfer Descriptors, Queue Heads, and queued Transfer Descriptors. These data structures are used by HCD software to construct a "schedule" in system memory for the host controller system 100 to execute. The USB Engine 168 stores the starting address of the Frame List, and makes use of the interrupt from the host controller system 100 to activate an interrupt handler routine to read from the system memory the link pointers in the Frame List, Transfer Descriptors, and Queue Heads. The USB Engine 168 uses the link pointer to determine where to find the next Transfer Descriptor to execute. Transfer descriptors point to data buffers and include information about the addressing, data, and general behavior characteristics of the transaction.

Another embodiment shown in FIG. 9*b* contains the full host controller system 100 and the USB Driver and the HCD 158 specifically written for the host controller system 100. In this embodiment, a Client Software (a USB device driver) written for an operating system such as Windows or Windows CE may directly interface with the USB Driver 158 of this invention. A call to an operating system's native USB Driver is intercepted by the USB Driver 158. To the operating system, it will appear as if the operating system's USB Driver and Host Controller Driver handled the USB requests, but in fact, it is the USB Engine 168 and the USB Driver 158 of this invention that processed and responded to the operating system's USB request.

Although the foregoing description of the preferred embodiment of the present invention has shown, described, and pointed out the fundamental novel features of the invention, it will be understood that various omissions, substitutions, and changes in the form of the detail of the apparatus as illustrated, as well as the uses thereof, may be made by those skilled in the art without departing from the spirit of the present invention. Hence, the scope of the present invention should not be limited to the foregoing discussion, but should be defined by the appended claims.

What is claimed is:

1. A USB host controller system for interfacing between at least one USB device and a host processor, the system comprising:
   a host controller that transfers USB transactions between at least one USB device and the host processor; and
   at least one memory associated with the host controller, wherein the host controller receives a plurality of USB transactions each having an associated transaction descriptor and assembles the USB transactions in the memory as a single batch and wherein the host processor induces the dispatch of the assembled batch as a composite signal that is subsequently decoded upon arrival as discrete USB transactions processed according to the transaction descriptors in such a manner so as to reduce interrupts to the host processor thereby reducing overall latency and resource demand on the host processor during execution of the USB transactions and increasing the overall data throughput as compared to transmitting the plurality of USB transactions individually.

2. The system of claim 1, wherein the host controller executes the plurality of stored USB transactions in a single batch in response to receiving a single signal from the host device.

3. The system of claim 1, wherein each USB transaction includes a transaction descriptor and wherein the at least one memory includes a control memory wherein transaction descriptors are stored for each USB transaction.

4. The system of claim 3, wherein the host controller evaluates the transaction descriptors for each USB transaction to determine whether to report the USB transaction status to the host microprocessor immediately for processing or to report the USB transaction status as part of the single batch after all the transactions in the batch are executed.

5. The system of claim 1, wherein the host controller generates an interrupt signal that is sent to the host microprocessor when a batch is complete or when the host controller determines that a USB transaction has a transaction descriptor indicating that the USB transaction should be reported to the host microprocessor immediately after it is executed.

6. The system of claim 1, wherein the host controller is adapted to organize more than one batch of USB transactions simultaneously so as to reduce the demand on the host microprocessor, or to improve the data throughput on the USB.

7. The system of claim 1, wherein the host controller is adapted to organize transactions into a single batch and if the batch of USB transactions cannot fit within a single frame, the remaining transactions are set into the next sequential frame.

8. The system of claim 1, further comprising a USB interface that interfaces the host controller with a plurality of USB devices.

9. A method of interfacing a plurality of USB devices with a host processor, the method comprising:
   assembling a first batch of USB transactions in a memory;
   sequentially executing each of the USB transactions of the first batch in the memory;
   sending an interrupt signal to a host processor indicating that the first batch of USB transactions has been completed so that the host processor is interrupted less thereby reducing the overall resource demand on the host processor during execution of the first batch of USB transactions.

10. The method of claim 9, further comprising evaluating each USB transaction to determine whether to report the status of a USB transaction to the host processor on an expedited basis.

11. The method of claim 10, sending an interrupt to the host processor reporting the status of a USB transaction on an expedited basis upon determining that an accelerated interrupt condition has been set and met for the USB transaction.

12. The method of claim 9, further comprising assembling a second batch in the memory while the host controller is sequentially executing each of the USB transaction in the first batch.

13. A USB host controller that is adapted to receive and assemble information indicative of a plurality of USB transactions from a host processor wherein the USB host controller executes an assembled batch of plurality of USB transactions upon meeting a certain condition and makes available to the host processor of the status of the plurality of USB transactions upon completion of the batch to thereby reduce the overall resource demand on the host processor during execution of the batch of USB transactions.

14. The controller of claim 13, wherein the host controller is adapted to assemble the batch in a memory associated with the host controller.

15. The controller of claim 13, wherein the controller evaluates the status of each USB transaction to determine if the transaction status should be reported to the host processor on an expedited basis and, if it determines that the transaction should be reported on an expedited basis, the controller is adapted to generate an interrupt signal.

16. The controller of claim 13, wherein the certain condition comprises at least one internal signal in the host controller.

17. The controller of claim 13, wherein the certain condition comprises receipt of a single signal from the host processor.

18. The controller of claim 13, wherein the certain condition comprises receipt of a pre-selected number of USB transactions from the host microprocessor.

19. The controller of claim 13, wherein the certain condition does not require intervention by the host microprocessor.

20. The controller of claim 13, wherein the host controller sends an interrupt signal to the host microprocessor when a batch of transactions has been completed.

21. A USB system comprising:

a host microprocessor;

at least one memory associated with the host microprocessor;

an embedded microprocessor bus whose bus master for memory access is the host microprocessor;

an embedded USB host controller that executes a batched USB transaction comprising a plurality of discrete USB transactions, and upon completion sends an interrupt signal to the host microprocessor such that the host microprocessor in response to the interrupt signal manipulates data in at least one memory such that a USB host stack associated with the USB system that is designed to be used with a bus that is controllable by the USB host controller can be used with the embedded USB host controller.

22. The USB system of claim 21, wherein the at least one memory comprises a plurality of memories and the host controller sends interrupt signals that induces the host microprocessor transfer data from one memory to another.

23. The USB system of claim 22, wherein the interrupt induces the host microprocessor to push transaction descriptors and data from one of the plurality of memories to the host controller and pull transaction descriptors and data from the host controller to another one of the plurality of memories.

24. The USB system of claim 21, wherein the host controller sends interrupt signals to the host microprocessor in such a manner so as to provide either a UHCI or an OHCI interface to the USB system without requiring a controllable USB bus.

25. The USB system of claim 21, wherein the embedded microprocessor bus is configured to permit Direct Memory Access (DMA).

26. A USB system comprising:

a host controller that is configured to execute a batched USB transaction comprising a plurality of discrete USB transactions, and upon completion issues an interrupt signal; and a host microprocessor that receives the interrupt signal from the host controller and upon receipt manipulates data in an associated memory so as to provide either a UHCI or an OHCI interface to a USB host stack without requiring a controllable USB bus be associated with the host microprocessor.

27. The USB system of claim 26, wherein the USB host controller sends interrupt signals to the host microprocessor that induces the host microprocessor to transfer data from one memory section to another.

28. The USB system of claim 27, wherein the interrupts are configured to induce the host microprocessor to push transaction descriptors and data from one of the system memory sections to the host controller and pull transaction descriptors and data from the host controller to another one of the system memory sections.

* * * * *